(12) United States Patent
Shan

(10) Patent No.: US 7,054,396 B2
(45) Date of Patent: May 30, 2006

(54) METHOD AND APPARATUS FOR MULTIPATH SIGNAL COMPENSATION IN SPREAD-SPECTRUM COMMUNICATIONS SYSTEMS

(75) Inventor: Peijun Shan, Jamestown, NC (US)

(73) Assignee: RF Micro Devices, Inc., Greensboro, NJ (US)

( * ) Notice: Subject to any disclaimer, the term of this patent is extended or adjusted under 35 U.S.C. 154(b) by 828 days.

(21) Appl. No.: 10/224,001

(22) Filed: Aug. 20, 2002

(65) Prior Publication Data

US 2004/0037380 A1    Feb. 26, 2004

(51) Int. Cl.
    *H04L 25/08* (2006.01)
(52) U.S. Cl. .................................. 375/346; 375/232
(58) Field of Classification Search ........ 375/147–148, 375/230, 232, 233, 285, 346–349; 455/63.1, 455/65, 67.13, 132, 133–137
    See application file for complete search history.

(56) References Cited

U.S. PATENT DOCUMENTS

| | | | |
|---|---|---|---|
| 5,077,753 A | 12/1991 | Grau, Jr. et al. ................ 375/1 |
| 5,361,276 A | 11/1994 | Subramanian ................ 375/1 |
| 5,414,734 A | 5/1995 | Marchetto et al. .......... 375/267 |
| 5,673,286 A | 9/1997 | Lomp ......................... 375/208 |
| 5,689,528 A | 11/1997 | Tsujimoto ................... 375/233 |
| 5,692,008 A | 11/1997 | Van Nee ..................... 375/208 |
| 5,706,314 A * | 1/1998 | Davis et al. ................. 375/340 |
| 5,809,060 A | 9/1998 | Cafarella et al. ........... 375/206 |
| 5,995,538 A | 11/1999 | Lomp ......................... 375/208 |
| 6,009,089 A | 12/1999 | Huang et al. ............... 370/342 |
| 6,069,917 A | 5/2000 | Werner et al. .............. 375/233 |
| 6,075,812 A | 6/2000 | Cafarella et al. ........... 375/206 |
| 6,333,947 B1 | 12/2001 | van Heeswyk et al. ..... 375/148 |
| 6,541,950 B1 | 4/2003 | Townsend et al. ........ 324/76.14 |
| 6,563,858 B1 * | 5/2003 | Fakatselis et al. ........... 375/148 |
| 6,647,007 B1 * | 11/2003 | Zoernack ..................... 375/346 |
| 6,700,929 B1 * | 3/2004 | Shan et al. ................. 375/224 |
| 6,728,324 B1 * | 4/2004 | Shan et al. ................. 375/346 |

FOREIGN PATENT DOCUMENTS

| | | |
|---|---|---|
| EP | 0932263 A2 | 7/1999 |
| EP | 0 981 206 A1 | 2/2000 |

(Continued)

OTHER PUBLICATIONS

Lingwood, Stephen et al., "ASIC Implementaion of a Direct-Sequence Spread-Spectrum RAKE-Receiver," IEEE 44th Vehicular Technology Congerence, Jun. 8-10, 1994, XP010123293.

(Continued)

*Primary Examiner*—Khanh Tran
(74) *Attorney, Agent, or Firm*—Withrow & Terranova, PLLC

(57) ABSTRACT

The equalizer of the present invention operates on input multipath signal samples, preferably at chip or sub-chip resolution, to remove or substantially cancel the effects of one or more secondary signals from the main path signal. Using predetermined path information for one or more of the secondary path signals, including magnitude, phase, and time offset relative to the main path signal, the equalizer compensates input multipath signal samples by subtracting estimated secondary signal values from the input samples. For each input sample, the equalizer forms a sliced sample, where the sliced sample represents a nominal phase value defined by the modulation scheme used in the original chip or symbol transmission that is closest in value to the actual phase of the input sample. These sliced samples are held in a running buffer and used, in combination with the predetermined path information and scaling logic, to form the estimated secondary signal values for compensating the input samples.

39 Claims, 15 Drawing Sheets

FOREIGN PATENT DOCUMENTS

WO       WO 98/26544       6/1998

OTHER PUBLICATIONS

Väisänen, Kari and Renfors, Markku, "Efficient Digital Filters for Pulse-Shaping and Jitter-Free Frequency Error Detection and Timing Recovery," Signal Processing, vol. 81, No. 4, Apr., 2001 pp. 829-844, XP004234879.

International Search Report for PCT/US2004/014055 mailed Nov. 4, 2004.

3COM Corporation, "IEEE 802.11b Wireless LANs," http://www.3com.com/technology/tech_net/white_papers/503072a.html.

Andren, Carl and Webster, Mark, "CCK Modulation Delivers 11Mbps for High Rate IEEE 802.11 Extension," Wireless Symposium/Portable by Design Conference Proceedings, Mar. 14, 2000 XP002147321.

Fuente, M. P., Guo, Y. J., and Barton, S.K., "A New Scheme for Direct Sequence Spread Spectrum Radio LANs," IEEE 4th International Symposium, Mainz Germany, Sep. 22-25, 1996, XP010208831.

Hou, Wen-Shang, and Chen, Bor-Sen, "Adaptive Detection in Asynchronous Code-Division Multiple-Acess System in Multipath Fading Channels," IEEE Transactions on Communications, vol. 48, No. 5, May 2000, pp. 863-874.

Kim, Su Il and Lee Hwang Soo, "Performance Improvement of RAKE Receiver for a Multicode DS-CDMA System with Multistage Interference Cacellation Detectors," Proceedings of IEEE Tencon '99, Sep. 15-17, 1999, vol. 1, pp. 573-576.

Prasad, Ramjee and Ojanpera, Tero, "An Overview of CDMA Evolution Toward Wideband CDMA," IEEE Communications Surveys, 1998, http://www.comsoc.org/pubs/surveys/4q98issue/prasad.html.

* cited by examiner

|  | $P_{-1}$ | $P_0$ | $P_{+1}$ |  |  |
|---|---|---|---|---|---|
MAIN SAMPLES

| $45°_1$ | $90°_2$ | $180°_3$ | $135°_4$ | $0°_5$ | — 730 |

SECONDARY SAMPLES

| $76°_1$ | $112°_2$ | $204°_3$ | $158°_4$ | $32°_5$ | — 720 |

$P_{-1}$  $P_0$  $P_{+1}$ $\theta_0 = P_{-1}$ (SECONDARY) $- P_0$ (MAIN) $= 76 - 180 = -104°$
$\theta_1 = P_0$ (SECONDARY) $- P_0$ (MAIN) $= 112 - 180 = -68°$
$\theta_2 = P_{+1}$ (SECONDARY) $- P_{-1}$ (MAIN) $= 112 - 90 = 22°$ SELECT $\theta_2$

*FIG. 7C*

METHOD AND APPARATUS FOR MULTIPATH SIGNAL COMPENSATION IN SPREAD-SPECTRUM COMMUNICATIONS SYSTEMS

FIELD OF THE INVENTION

The present invention generally relates to direct-sequence spread spectrum (DSSS) communications systems, and particularly relates to compensating a received multipath signal in a DSSS receiver.

BACKGROUND OF THE INVENTION

In wireless communications systems, successfully extracting transmitted information from a received signal oftentimes requires overcoming significant levels of interference. Multipath interference represents one type of received signal interference that can be particularly problematic in certain types of wireless communications systems. For example, wireless LANs are typically employed in indoor environments that commonly include partitioned walls, furniture, and multiple doorways, along with various metallic and non-metallic building features. In these environments, transmitted signals follow multiple transmission paths of differing lengths and attenuation. Consequently, a receiver in such an environment receives multiple, time-offset signals of differing signal strengths. These multiple versions of the same transmit signal are termed "multipath signals."

The effect of multipath signals on DSSS receiver performance depends upon the particulars of the communications system in question. For example, in certain types of DSSS communications systems, multipath signals can actually improve receiver signal-to-noise ratio. To understand this phenomenon, it is helpful to highlight a few basic aspects of DSSS communications. DSSS transmitters essentially multiply an information signal by a pseudo-noise (PN) signal—a repeating, pseudo-random digital sequence. Initially, the information signal is spread with the PN signal, and the resultant spread signal is multiplied with the RF carrier, creating a wide bandwidth transmit signal. In the general case, a receiver de-spreads the received signal by multiplying (mixing) the incoming signal with the same PN-spread carrier signal. The receiver's output signal has a maximum magnitude when the PN-spread signal exactly matches the incoming received signal. In DSSS systems, "matching" is evaluated based on correlating the incoming PN-sequenced signal with the receiver's locally generated PN-sequenced signal.

The spreading code (PN code) used by the transmitter to spread the information signal significantly influences the effects of multipath signals on receiver performance. DSSS transmissions based on a single spreading code with good autocorrelation properties (or on a small set of orthogonal spreading codes) allow the receiver to selectively de-correlate individual signals within a multipath signal relatively free of interference from the other signals within the multipath signal. By adjusting the PN-sequence offset used to generate its local PN despreading signal, the receiver can time-align (code phase) its despreading circuitry with any one of the multipath signals it is receiving. If the spreading/despreading PN code has good autocorrelation and cross-correlation properties, the receiver can recover the transmitted data from any one of these multipath signals without undue interference. Of course, it may be preferable to use only the strongest multipath signal(s) for information recovery.

Indeed, conventional RAKE receivers used in Code-Division Multiple Access (CDMA) digital cellular telephone systems exploit the above situation. CDMA transmissions use a relatively long, fixed spreading code for a given receiver and transmitter pair, which results in very favorable auto- and cross-correlation characteristics. RAKE receivers are well known in the art of digital cellular receiver design. A RAKE receiver includes multiple, parallel "RAKE fingers." Each RAKE finger can independently synchronize with and de-spread a received signal.

By synchronizing the multiple RAKE fingers to the strongest received multipath signals (those with the highest correlation values), the RAKE fingers lock on to the strongest multipath signals. Because of the excellent correlation properties of the CDMA spreading codes, each RAKE finger synchronizes with and de-spreads one of the multipath signals relatively free from interference associated with the other multipath signals. Thus, each RAKE finger de-spreads a relatively clean signal, allowing the overall RAKE receiver to coherently combine (with time/phase alignment) the signals to form a combined output signal that represents the addition of the multipath signals. Coherently combining the multipath signals allows the RAKE receiver to achieve an improvement in signal-to-noise ratio (SNR), essentially meaning that multipath signals can actually improve reception performance in certain types of spread spectrum systems.

Unfortunately, the characteristics of many other types of spread spectrum communications systems greatly complicate how a receiver deals with multipath signals. Some types of DSSS systems use spreading codes with poor correlation properties. The IEEE standard for high data-rate wireless LANs, known as 802.11b, is a primary example of such a system. Standard IEEE 802.11 transmissions use a single spreading code combined with binary phase-shift keying (BPSK) or quadrature phase-shift keying (QPSK) to transmit data at 1 or 2 Mbps, respectively. The 802.11b extensions provide higher data rates by defining 5.5 and 11 Mbps transmission rates. These higher data rates use a modulation format known as Complimentary Code Keying (CCK). 802.11b CCK-mode transmissions use multiple spreading codes, which change across symbols. While providing the ability to achieve high data transfer rates and still maintain compatibility with the standard 802.11 1 and 2 Mbps channelization scheme, CCK modulation does include the drawback of making it more difficult for receivers to cleanly despread individual multipath signals.

Indeed, due to the relatively poor correlation properties of the spreading codes used in 802.11b, the various multipath signals can interfere with each other and result in inter-symbol interference (ISI) at the receiver. Thus, in contrast to the CDMA digital cellular scenario, multipath signals can significantly degrade receiver performance in systems operating under 802.11b standards. Of course, multipath signals may be problematic in any type of DSSS system that uses less-than-ideal spreading codes, so the problem is not limited to wireless LAN applications. Multipath interference in DSSS systems arises from both inter-chip interference (ICI) and ISI. For the purposes of this disclosure, the term ISI is understood to include both ICI and ISI. From the perspective of a DSSS receiver, each transmitted symbol results in the reception of multiple symbols arriving with relative time offsets from each other, due to the multiple signal propagation paths between receiver and transmitter. ISI, as used herein, describes multipath interference arising from these multiple received symbols and can include interference arising from multipath signal delay spreads exceeding one symbol period.

In DSSS systems where the spreading code(s) do not allow multipath signals to be individually despread without interference, RAKE receiver techniques are not applicable. The basis of RAKE receiver operation assumes that each RAKE finger can cleanly despread a selected multipath signal, which is subsequently combined with the output from other RAKE fingers to form an overall RAKE receiver output signal. If the output from the individual RAKE fingers is corrupted by multipath interference, the combined signal will be compromised and RAKE receiver performance will suffer.

Channel equalization offers a potential opportunity for improving receiver performance in a multipath channel. Unfortunately, conventional channel equalization techniques are not suitable for DSSS transmissions due to complexity. For any radio frequency channel, the term "channel-coherent bandwidth" describes the portion of a given channel's available bandwidth where a relatively flat frequency response may be observed. Typically, only a small portion of a wideband DSSS channel may exhibit a flat frequency response. Consequently, existing equalizers exploiting conventional digital filtering techniques are inappropriate for compensating a wideband DSSS channel for multipath interference. This inappropriateness results from the sheer complexity associated with implementing and training a conventional digital filter, which has a finite number of filter taps and corresponding filter coefficients, and is capable of compensating the received signal for the complex frequency response of a wideband DSSS radio channel.

Existing approaches to DSSS receiver design do not adequately address multipath interference in systems where individual multipath signals cannot be despread relatively free of interference. As noted, these types of systems are typically based on less-than-ideal spreading codes, with IEEE 802.11b representing an example of such systems. Without the ability to handle multipath interference, such systems cannot reliably operate in environments with significant multipath interference. Existing approaches, including the use of RAKE receivers or conventional channel equalizers, are either inappropriate or impractical.

Effective handling of multipath signals, whether for the purpose of interference compensation, such as in 802.11b environments, or for the purpose of coherent multipath signal combination, such as in RAKE receiver operations, depends upon developing accurate estimates of propagation path characteristics for one or more of the secondary propagation path signals included in the received signal. Under many real world conditions, the delay spread among the individual propagation path signals comprising a received multipath signal exceeds one symbol time, meaning that, at any one instant in time, the various propagation path signals may represent different information values (symbol values), making it potentially difficult to relate one propagation path signal to another. Without the ability to identify and compensate for secondary signals offset from the main signal by more than a symbol time, only multipath signals having secondary signal propagation path delay spreads less than a symbol time may be processed to remove multipath interference.

In reality, the transmitted signal in 802.11(b) environments is not square-shaped in order to meet bandwidth and other spectrum requirements. The transmitted signal is approximately pulse-shaped, and in order to accurately estimate the secondary propagation path signal, a receiver must be capable of reproducing this signal. U.S. patent application Ser. No. 09/629,588 filed Jul. 31, 2000 discloses a method and apparatus for multipath signal compensation in spread-spectrum communications systems that assumes a transmitted signal having a square shape, and is incorporated herein by reference in its entirely.

Thus, there remains a need for a method and supporting apparatus that provides for improved multipath signal compensation (interference cancellation) over a broad range of multipath delay spreads. More particularly, there is a need for multipath signal compensation that supports the cancellation of one or more secondary signals from a received multipath signal that is adaptable over a broad range of delay spread, from delay spreads substantially less than one symbol time, to delay spreads substantially more than one symbol time.

With the ability to compensate a received multipath signal for secondary signal interference over a wide range of time offsets between the main and secondary signals, a communications receiver can effectively remove or cancel the effects of secondary signals on the main signal within a received multipath signal in a variety of environments, even those with severe multipath conditions, thus enhancing communications receiver performance. This improved method and supporting apparatus would be particularly valuable in any type of DSSS communications system that relies on spreading techniques that do not intrinsically provide multipath interference rejection, but would also be valuable in any DSSS communications system subject to multipath signal reception.

SUMMARY OF THE INVENTION

The equalizer of the present invention operates on input multipath signal samples, preferably at chip or sub-chip resolution, to remove or substantially cancel the effects of one or more secondary signals from the main path signal. Using predetermined path information for one or more of the secondary path signals, including magnitude, phase, and time offset relative to the main path signal, the equalizer compensates input multipath signal samples by subtracting estimated secondary signal values from the input samples. For each input sample, the equalizer forms a sliced sample, where the sliced sample represents a nominal phase value defined by the modulation scheme used in the original chip or symbol transmission that is closest in value to the actual phase of the input sample. These sliced samples, herein referred to as hard-decision values, are held in a running buffer and used, in combination with the predetermined path information and scaling logic, to form the estimated secondary signal values for compensating the input samples.

In both structure and operation, the equalizer supports the cancellation of secondary signal interference arising from multipath signal delay spreads, ranging from chip or sub-chip time offsets through multi-symbol time offsets. This ability to cancel selected multipath signal interference over a wide range of main-to-secondary signal delay spreads allows the equalizer to provide effective multipath signal compensation even in environments subject to severe multipath interference. Economically, the range of multipath signal delay spread accommodated by the equalizer depends only on the length of simple storage buffer structures, such as digital shift registers. Thus, more or less delay spread range may be accommodated without changing the essential structure and operation of the equalizer by simply changing the effective length of the buffers. Many embodiments may be realized for the equalizer of the present invention.

In some embodiments, the equalizer provides compensation only for secondary signals received through propagation paths having longer path delays than the main signal propagation path—referred to as post-cursor cancellation. In other embodiments, the equalizer may be configured to provide compensation only for secondary signals received through propagation paths having shorter path delays than the main signal propagation path—referred to as pre-cursor cancellation. In still other embodiments, the equalizer may be configured to provide both pre- and post-cursor cancellation. In an exemplary embodiment providing both pre- and post-cursor secondary signal cancellation capability, operation is detailed as follows.

The equalizer receives successive multipath input samples. Each input sample has one or more estimated secondary signal values subtracted, compensating for post-cursor secondary signal interference arising from one or more post-cursor secondary signals. A hard-decision value is formed and buffered for each compensated input sample. The predetermined path information includes a path coefficient that expresses estimated values for the magnitude and phase of a given secondary path signal relative to the main path signal, and further includes an estimated time offset between the given secondary path signal and the main path signal. Thus, the equalizer has a path coefficient and corresponding time offset for each secondary path signal for which cancellation is desired. For post-cursor secondary signal cancellation, a buffered hard-decision value, corresponding to an earlier input sample, is selected for each post-cursor secondary path signal based on choosing buffered values having delays with respect to the current input sample that are substantially equal to the time offsets of the post-cursor secondary signals.

In general, the estimate of a secondary path signal is equal to the complex multiplication of the associated path coefficient by the corresponding buffered hard-decision value being further multiplied by a scaling factor. In the case of M-ary PSK signals, the complex multiplication can be realized by rotating the phase of the path coefficient by an amount of the buffered hard decision value. Thus, for each path coefficient, the corresponding buffered hard-decision value is used to adjust the phase portion of the path coefficient. Essentially, the path coefficient expresses the relative phase shift between the secondary path signal and the main path signal, and the buffered hard-decision value provides the reference value for that shift. Once adjusted, each path coefficient represents an unscaled estimated secondary path signal value, corresponding to an earlier multipath input sample offset from the current input sample by a delay equal to the associated secondary path signal with respect to the main path signal. Scaling logic produces the scaling factor, such as 0, ½, or 1, based on the hard-decision values immediately preceding and following the current hard-decision value. The estimated secondary path signal is the product of the scaling factor and the unscaled estimated secondary path signal. The number of most-recent buffered hard-decision values sets the maximum delay between a current input sample and the oldest buffered hard-decision value, and therefore determines the maximum post-cursor secondary path signal delay spread that may be accommodated by the equalizer.

For pre-cursor cancellation, the post-cursor compensated sample values are sequentially delayed with respect to the buffered hard-decision values, necessary because pre-cursor secondary path signals arrive before the main path signal.

The maximum amount by which a given post-cursor compensated sample may be delayed with respect to the latest buffered hard-decision value determines the pre-cursor secondary path signal delay spread that may be accommodated by the equalizer. As with post-cursor cancellation, the equalizer selects buffered hard-decision values having delays corresponding to the time offsets of the respective pre-cursor secondary path signals for which cancellation is desired. These selected buffered hard-decision values are then used to estimate the pre-cursor secondary path signals based on multiplying them with the associated pre-cursor secondary path signal coefficients and an associated scaling factor. In the case of PSK-modulated received signals, the complex multiplication of the hard-decision values and associated pre-cursor secondary path signal coefficients can be realized by rotating the phase of the associated path coefficients based on the corresponding buffered hard-decision values. Scaling logic produces the scaling factor, such as 0, ½, or 1, based on the hard-decision values immediately preceding and following the current hard-decision value. The adjusted path coefficients are then multiplied by the scaling factor to form the estimated pre-cursor secondary signal values and these estimated values are subtracted from the sequentially delayed post-cursor compensated samples to remove effects of the associated pre-cursor secondary path signals from the main signal.

Essentially, the equalizer of the present invention makes hard decisions about the value of input samples, and uses these hard-decision values and associated scaling logic in its compensation of multipath signal interference. By including independent and architecturally simple delay structures for both hard-decision values and input sample values—preferably, compensated input sample values—the equalizer of the present invention may be configured to accommodate arbitrary multipath delay spread ranges for both pre- and post-cursor secondary path signals. The multipath signal delay spread resolution is determined by the resolution of the multipath signal input samples, which are preferably provided at chip or sub-chip resolution. With its optional input decimation block, the equalizer may be dynamically configured to operate at a desired input sample resolution equal to or less than the input sample resolution.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 7A:
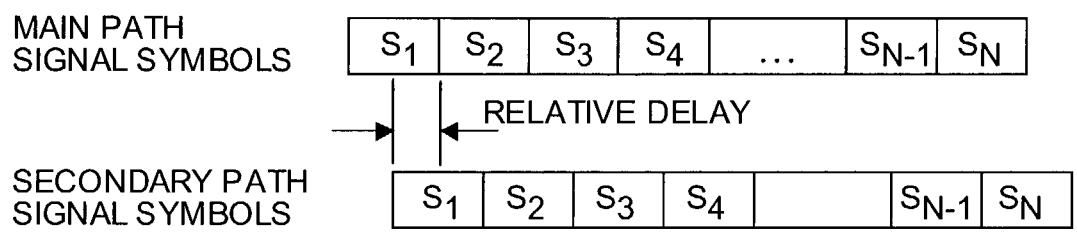
FIG. 7A depicts time-offset main and secondary path received signal symbol sequences.
Figure 7B:
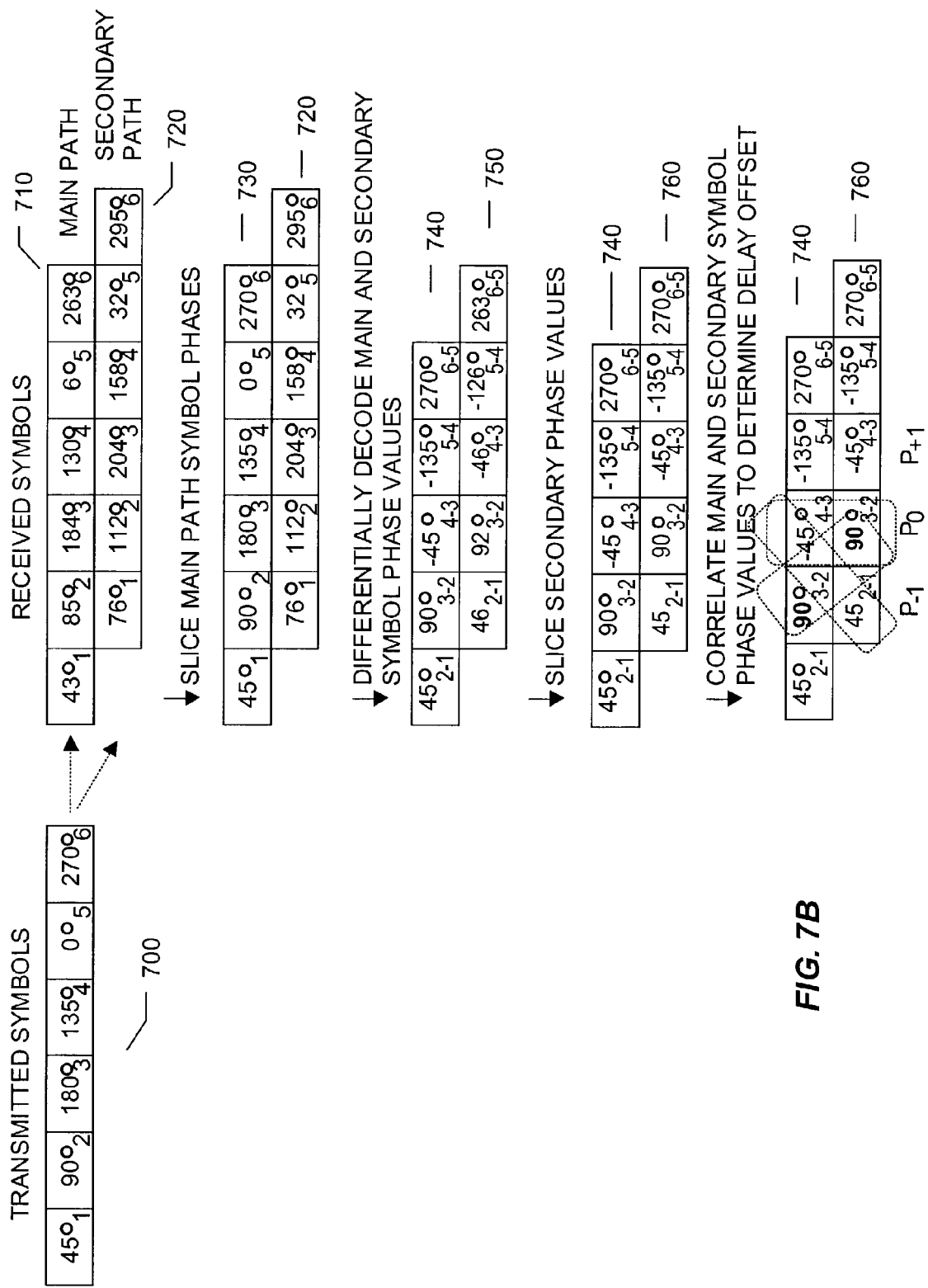

FIG. 7B provides exemplary details for a portion of the main and secondary path signal processing operations associated with an exemplary training method for supporting the present invention.

FIG. 7C illustrates how an unknown secondary signal phase shift may be determined based on the operations shown in FIG. 7B.

Figure 8:
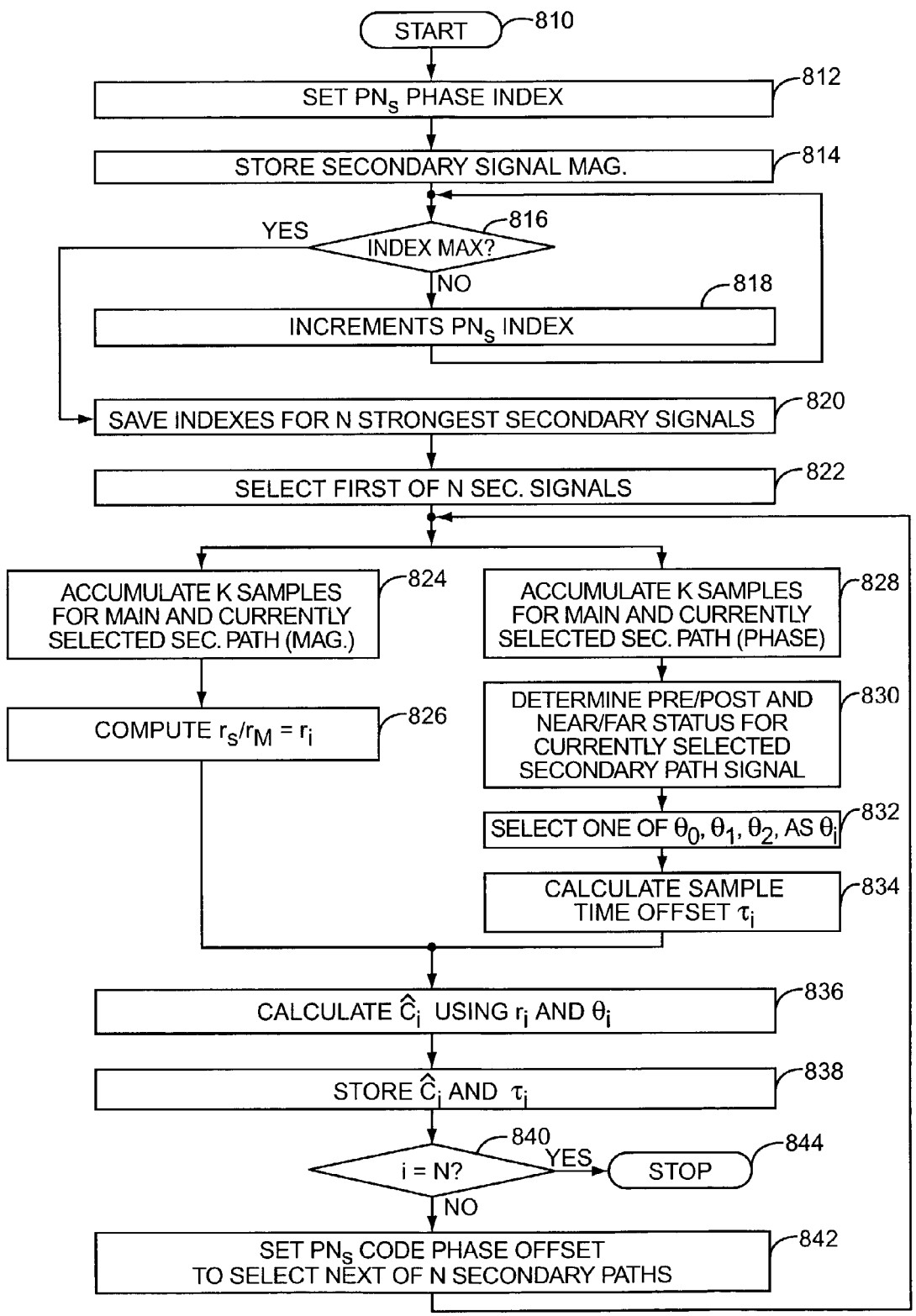

FIG. 8 is a simplified logic flow diagram for an exemplary embodiment of a training method that may be advantageously used with the present invention.

Figure 9:
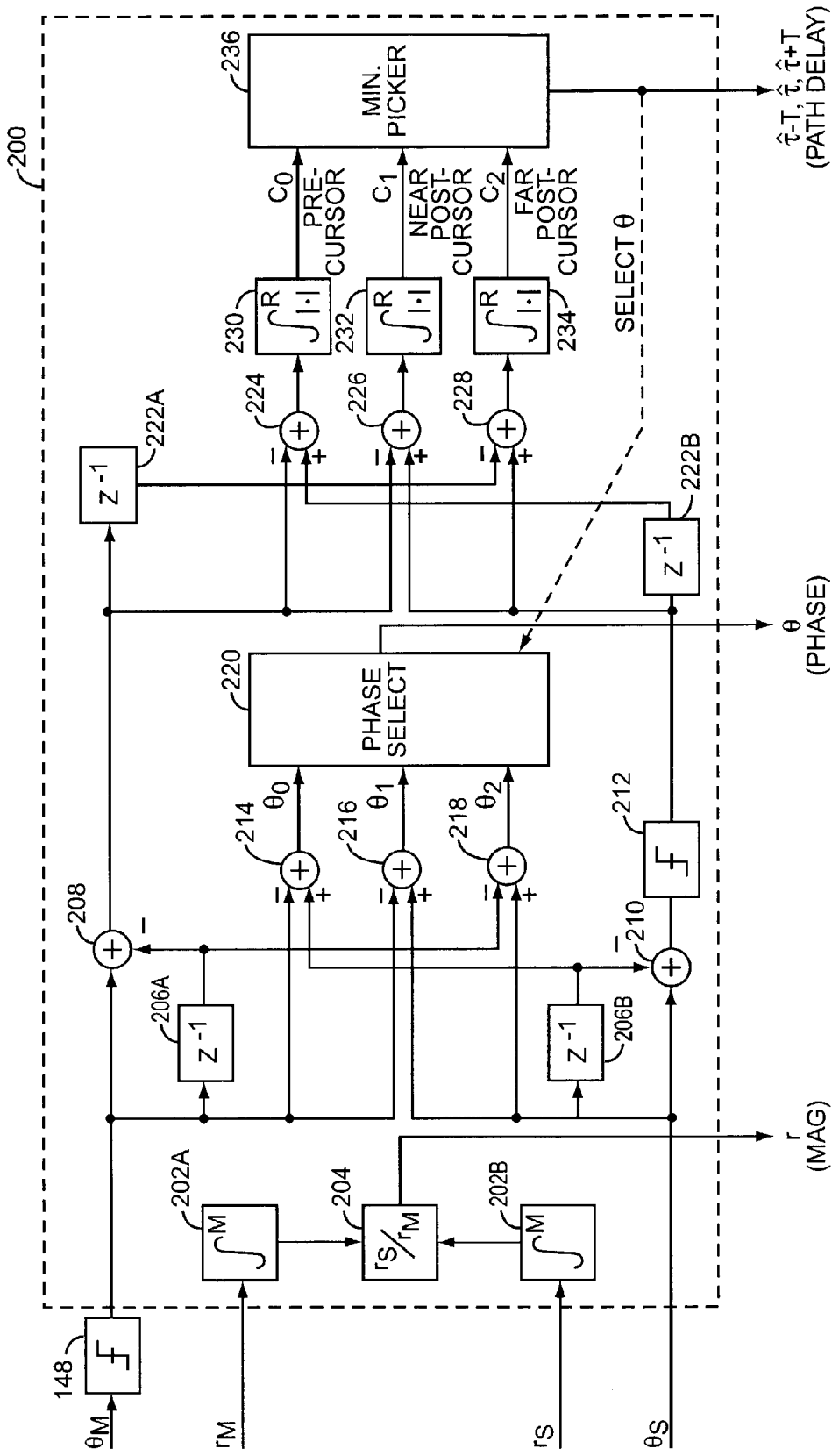

FIG. 9 is a simplified block diagram of an exemplary embodiment of a training circuit for practicing the training method illustrated in FIG. 8.

Figure 10A:
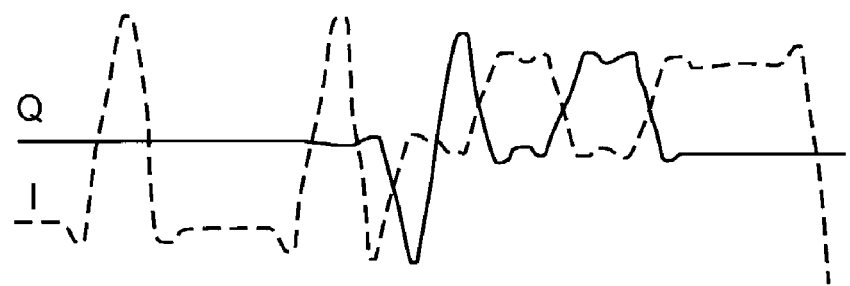

FIG. 10A illustrates an example of transmitted pulse-shaped CCK signal waveform.

Figure 10B:
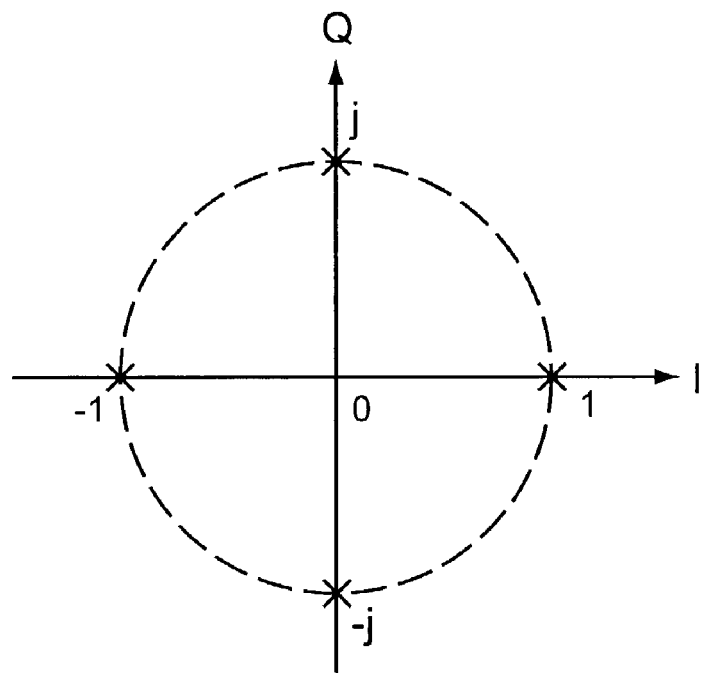

FIG. 10B illustrates an example of the QPSK constellation of a transmitted signal.

Figure 11:
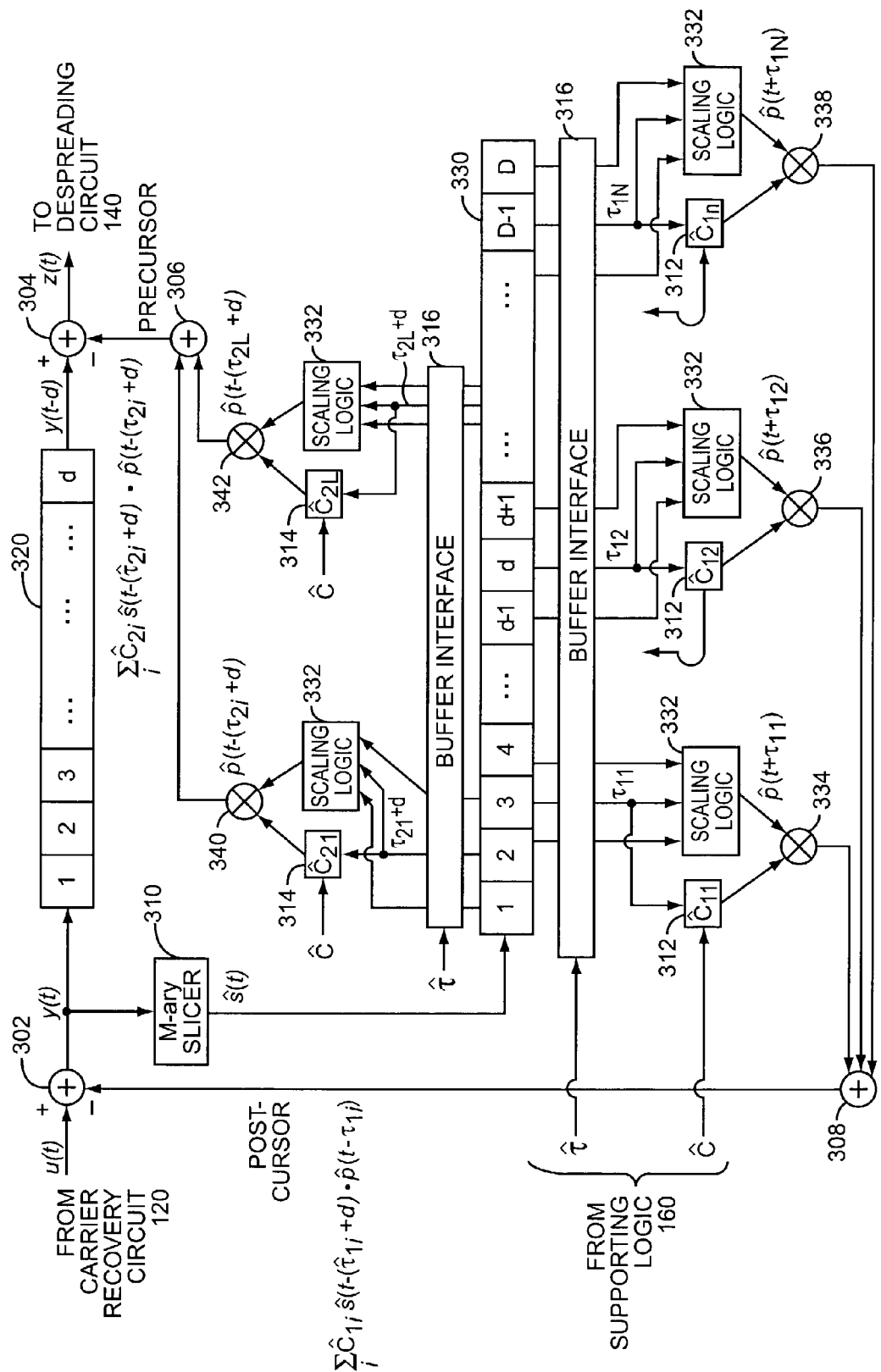

FIG. 11 is a generalized block diagram of an exemplary embodiment of the radio channel equalizer of the present invention.

Figure 12:
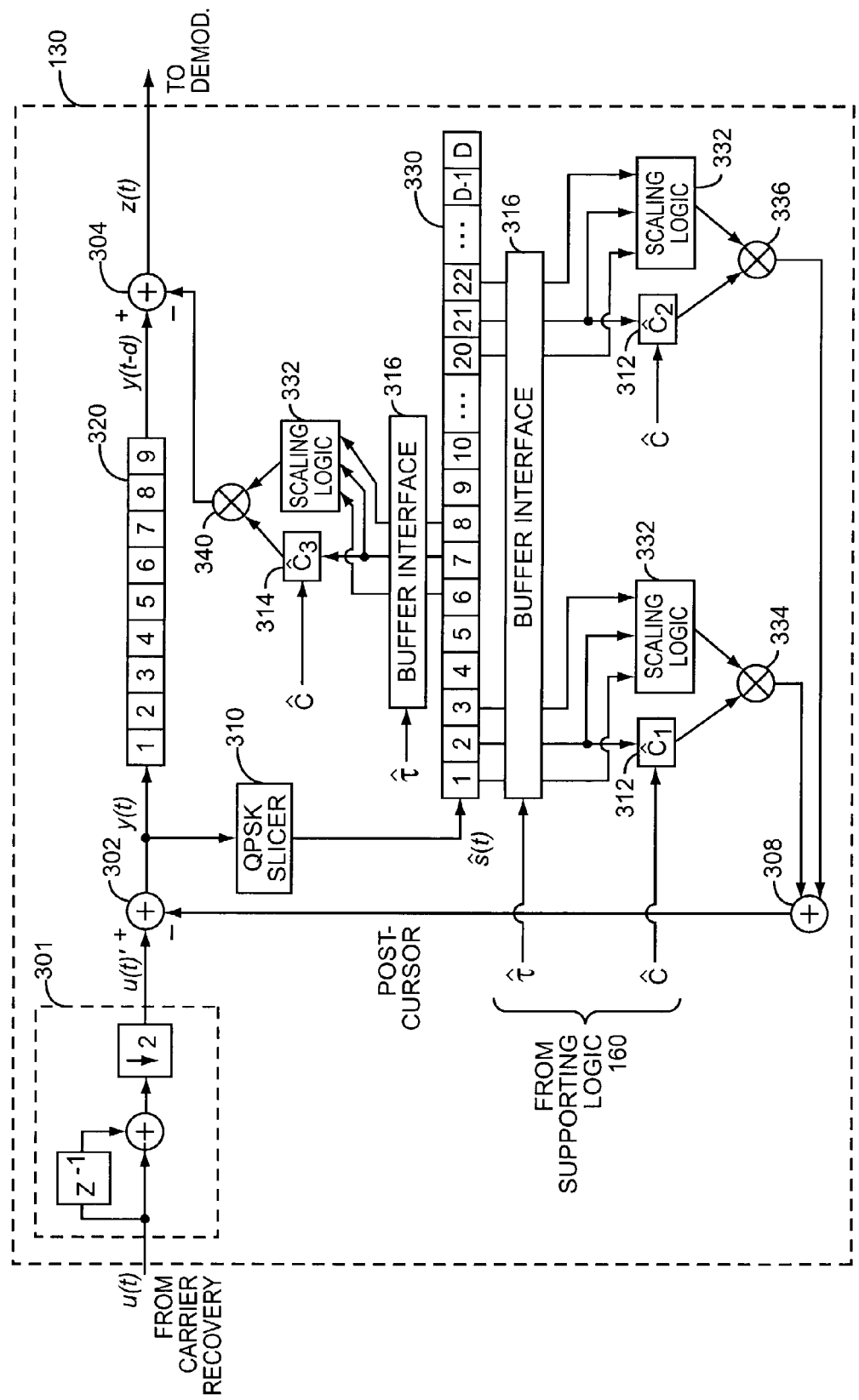

FIG. 12 is an alternate exemplary embodiment of the equalizer of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
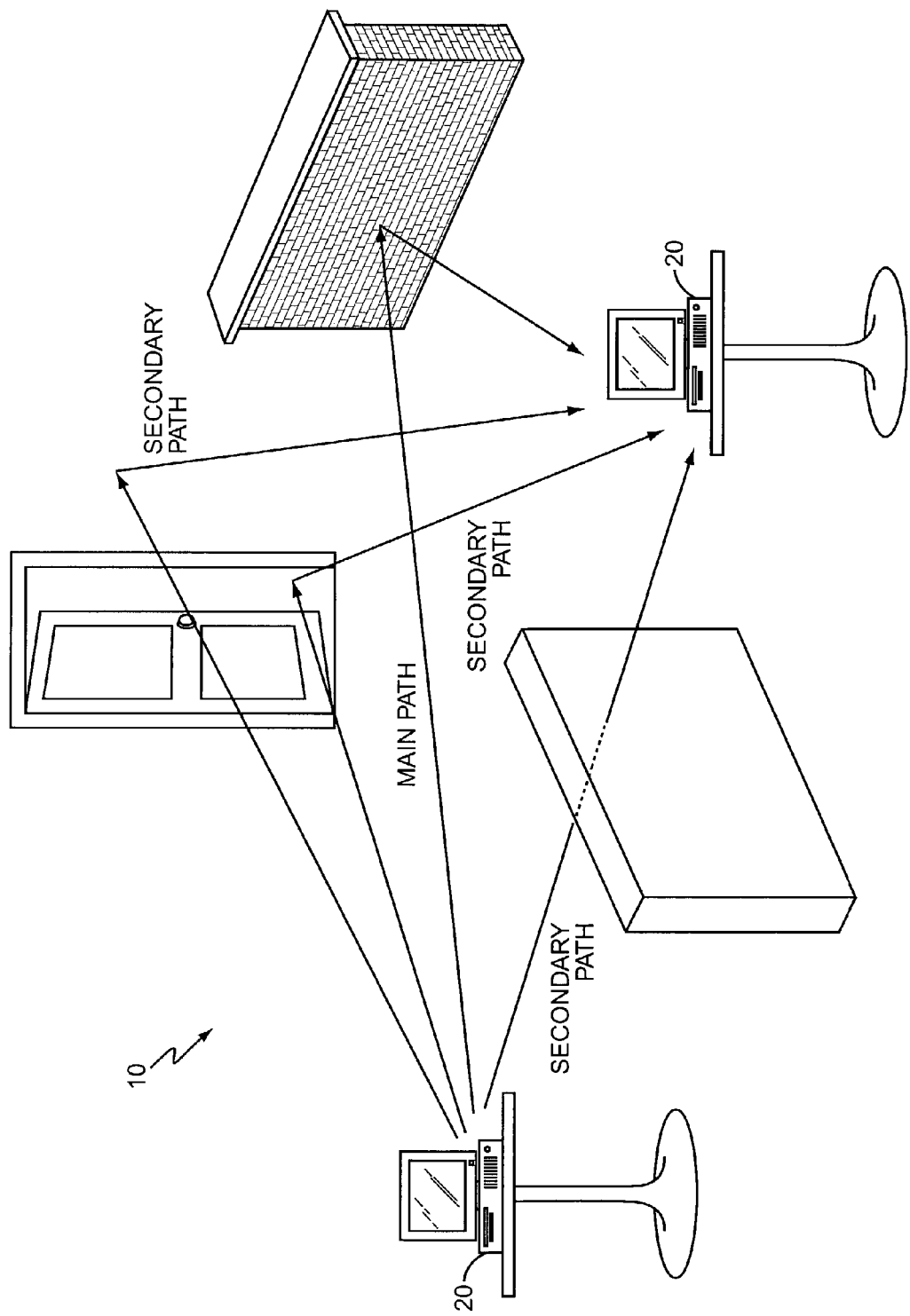
FIG. 1 illustrates a wireless communications environment subject to multipath signal reception.

FIG. 1 illustrates a wireless communications environment 10 subject to multipath interference. While FIG. 1 depicts two PCs 20 in wireless communications with each other, as might be expected in a wireless LAN environment, the present invention may be advantageously applied in any DSSS communications systems subject to multipath interference. As illustrated, multipath signals arise from intervening obstacles between a transmitter and a receiver—in this case, a transmitting PC 20 and a receiving PC 20. While not explicitly illustrated in FIG. 1, it will be readily appreciated that the multipath signals received by the receiving PC 20 may be subject to differing levels of attenuation and phase shifting based on the specific signal path followed by each signal. In the context of this disclosure, the main path signal is not necessarily the signal following the most direct route to the receiver; rather it is the strongest of the received multipath signals.

Figure 2A:
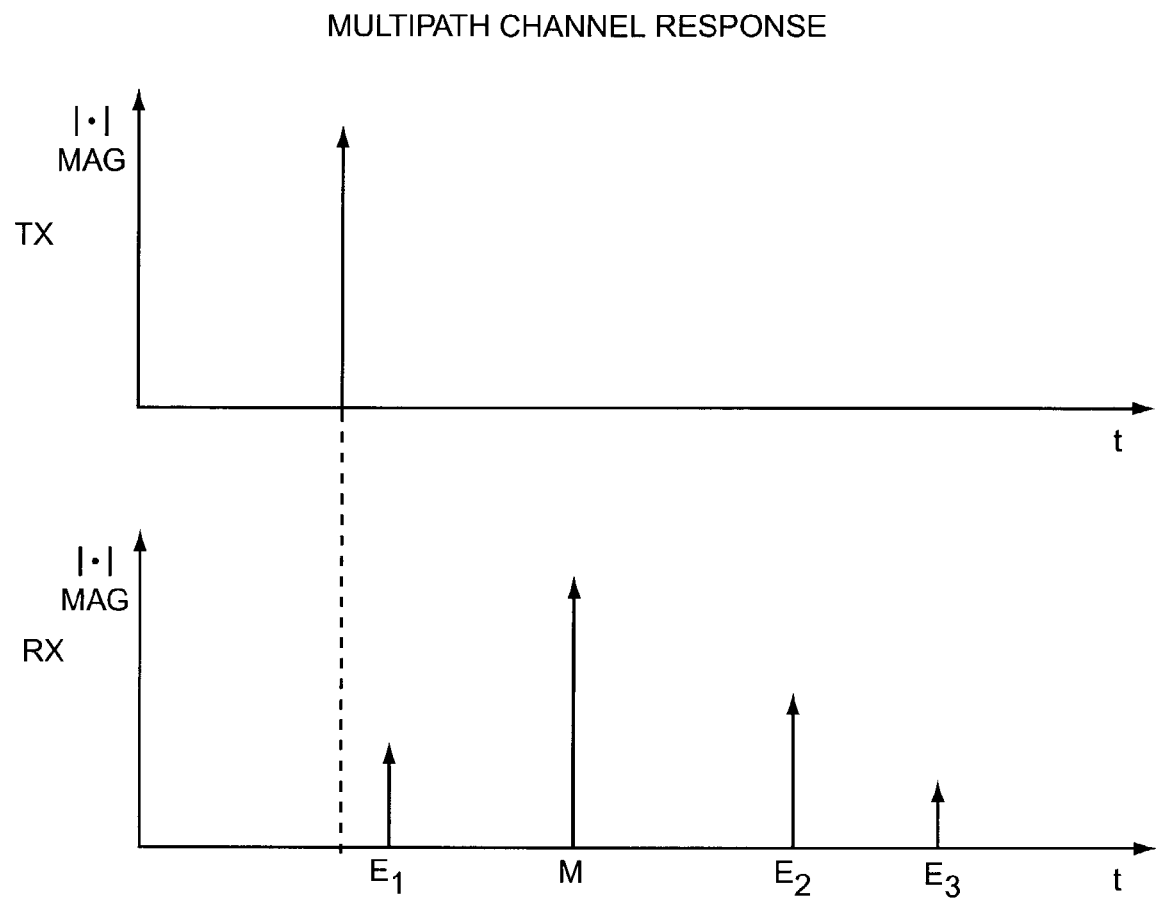
FIG. 2A illustrates the influence of multiple propagation paths on a received signal.

Because the multipath signals follow different signal paths of differing lengths, the various signals received by the receiver are subject to time dispersion. That is, the multipath signals are offset from one another by an amount of time proportionate to the difference in signal path length. FIG. 2A illustrates this time dispersion phenomenon. In FIG. 2A, the upper and lower horizontal time axes are aligned. An idealized impulse signal represents the transmitted data. Although the transmitter outputs a single clean impulse, the receiver actually receives multiple impulses at different times, with different amplitudes and phase due to multipath. The received signal with the largest amplitude is deemed the main path signal, denoted by "M" in FIG. 2A. The remaining, weaker signals are deemed echo or secondary multipath signals, and are denoted as $E_1 \ldots E_3$. Exemplary training method embodiments provide support characterization and subsequent cancellation for the two strongest secondary signals, while ignoring the weaker, remaining echo signals. In the context of FIG. 2A, the two strongest echo signals are $E_2$ and $E_1$. Note that the training method may be varied to characterize any number of secondary signals. Reception performance requirements and processing time limitations are considerations in choosing the number of secondary signals (echo signals) that will be characterized.

Figure 2B:
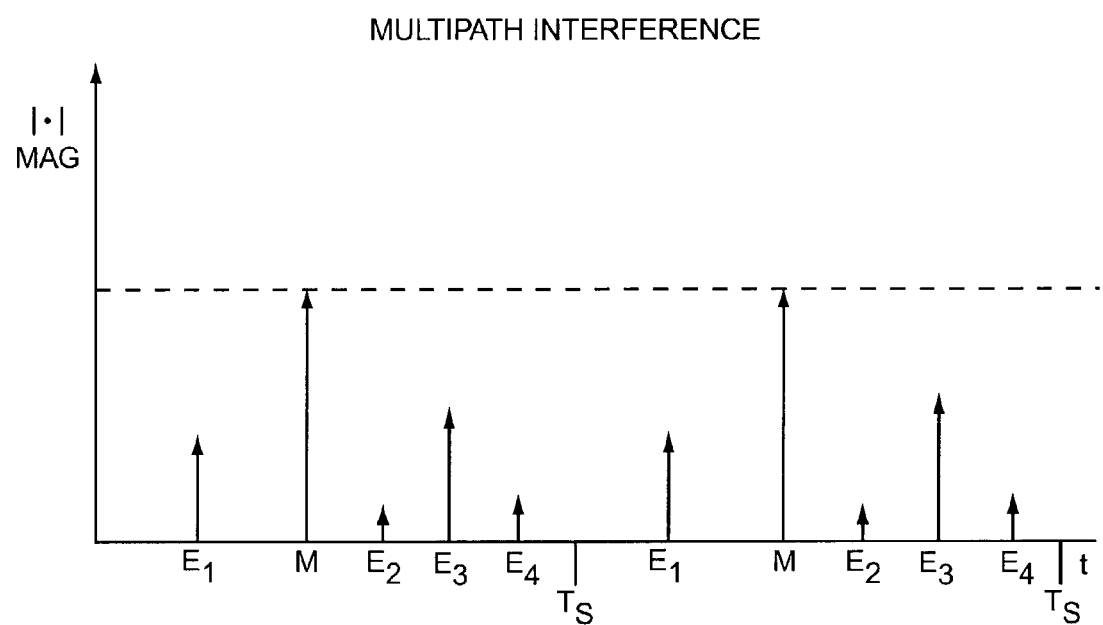
FIG. 2B illustrates the problem of inter-symbol interference in a sequence of received symbols.

In DSSS systems, information is transmitted from a transmitter to a receiver as a series of chips, with a defined number of chips forming a symbol. Each symbol corresponds to one or more known binary values. Thus, by decoding the received symbols, the receiver can re-create the binary data sent by the transmitter. Of course, to successfully decode these symbols, the receiver must synchronize with the transmitter's chip and symbol timing. FIG. 2B illustrates a sequence of received signals over at least two symbol times ($T_S$). What is not immediately apparent from FIG. 2B is whether one or more multipath events (echo signals) within a given symbol's time slot arises from the current symbol's transmission or from transmission of the previous symbol. Without the ability to make this determination, ISI cannot be effectively mitigated. The training method described herein provides an exemplary technique for identifying and characterizing multipath events with time offsets that may exceed one or more symbol times, and thus provides methods for identifying and compensating for ISI.

Figure 3:
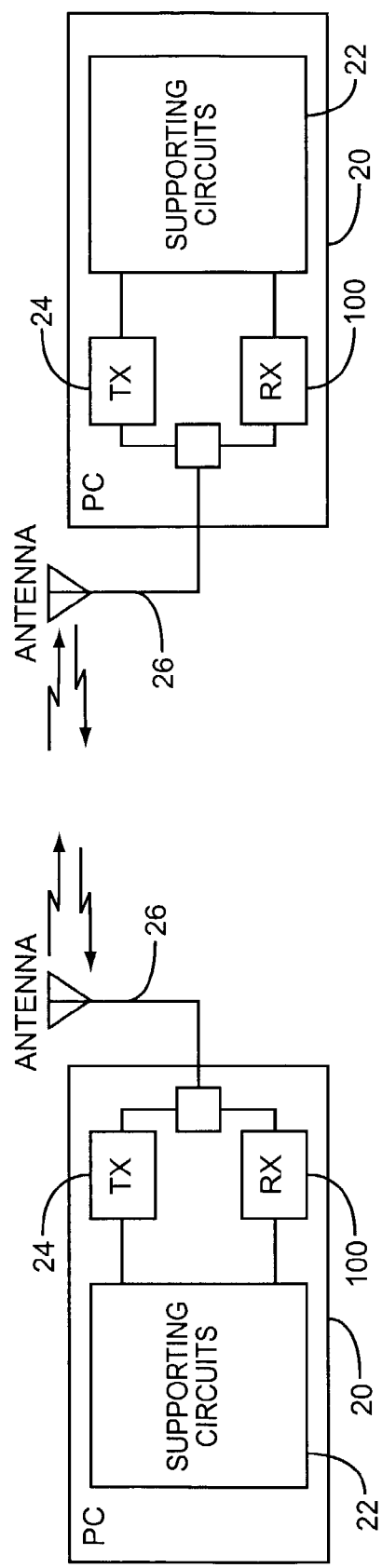
FIG. 3 illustrates an exemplary wireless networking system in which the present invention may be advantageously practiced.

FIG. 3 depicts an exemplary PC-based wireless LAN environment in which the various aspects of the present invention may be advantageously practiced. PCs 20 communicate with one another via wireless signaling, transmitting and receiving signals through antennae 26. Each PC 20 includes an exemplary communications receiver (RX) 100 supporting the training method and multipath signal equalization of the present invention, a compatible transmitter (TX) 24, and supporting circuitry 22. FIG. 3 is not meant as a depiction of actual structure for the inter-organization of PC 20; rather, FIG. 3 provides a functional depiction for the inclusion of the communications receiver 100 within a typical wireless LAN environment. The PCs 20 send and receive information via transmitters 24 and communications receivers 100, respectively. Such communications may be peer-to-peer (between PCs), or may be routed through a hub or server equipped with a wireless interface. The actual network organization and hierarchical structure used in a given application is not important with respect to understanding the present invention.

Ideally, the communications receiver 100 is implemented as a single integrated circuit, including portions supporting programmed operation, but may be implemented as a cooperative collection of integrated circuit devices collectively supporting the same functionality. Exemplary embodiments of the communications receiver 100 include the equalizer 130 of the present invention, as detailed below. However, the communications receiver 100 represents an exemplary communications system, and, therefore, should not be construed as limiting the range of applications for the equalizer 130. Indeed, the equalizer 130 may be advantageously included in a range of communication system types.

Figure 4:
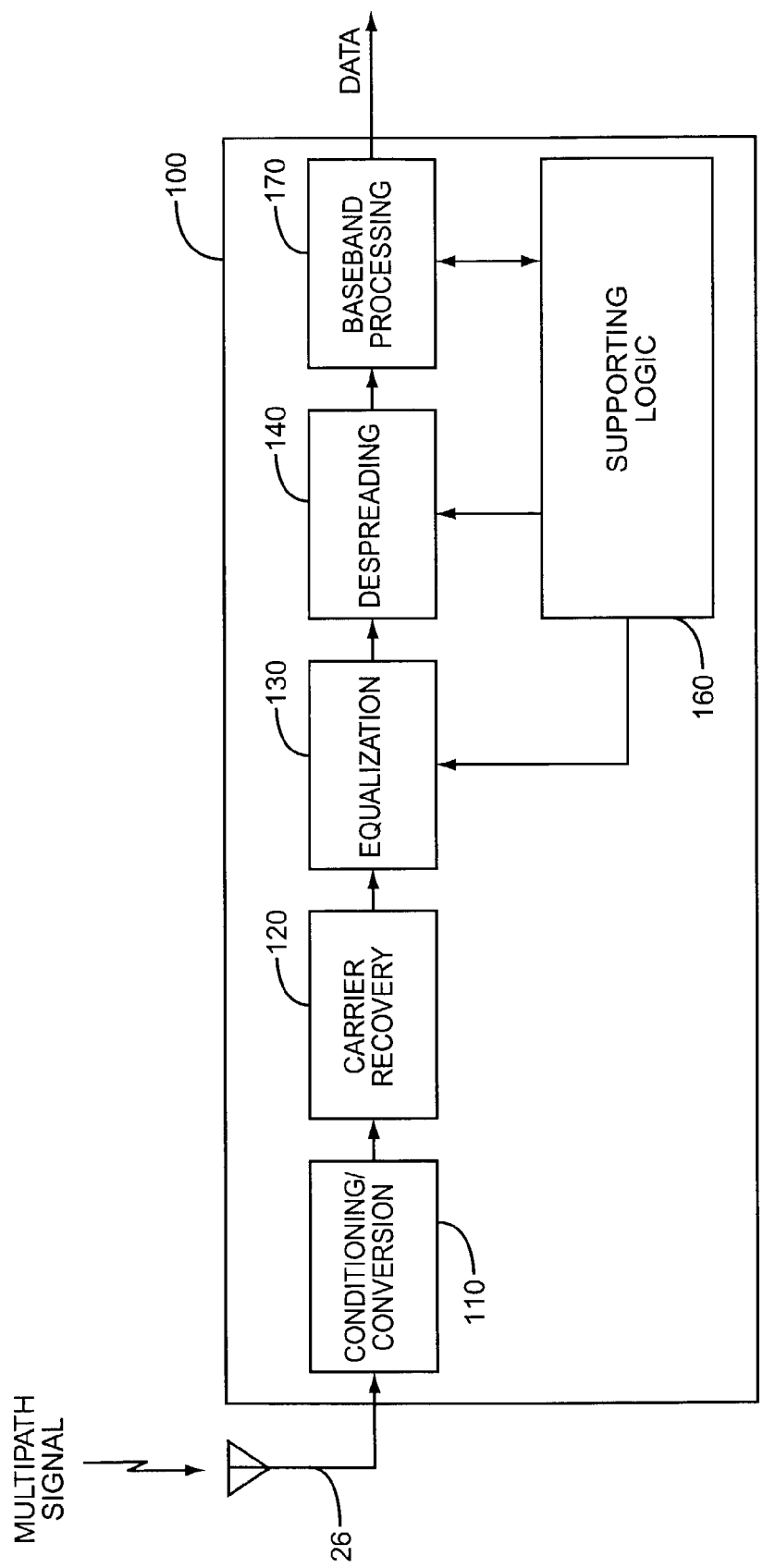
FIG. 4 is a generalized block diagram of an exemplary communications receiver that may advantageously include the present invention.

FIG. 4 provides a more detailed illustration of the communications receiver 100 introduced in FIG. 3. The communications receiver 100 includes a conditioning and conversion circuit 110, a carrier recovery circuit 120, an equalizer 130, a despreading circuit 140, a baseband processing circuit 170 including a training circuit 200 (shown in FIG. 5), and additional supporting logic 160.

Signals received through antenna 26 pass through the conditioning and conversion circuit 110, where they are filtered, optionally amplified, and converted from analog to digital format. Digital information then passes to the carrier recovery circuit 120. The carrier recovery circuit 120 maps received symbols in the main path signal to one of the ideal constellation points defined by the transmit signal modulation scheme. For example, QPSK-modulated symbols map to one of the 4 defined constellation points, namely +/−1 and +/−j. Output from the carrier recovery circuit 120 passes to the equalizer 130 in the illustrated embodiment.

In order for the equalizer 130 to effectively cancel selected multipath interference from the received multipath signal, the communications receiver 100 must properly configure the equalizer 130 based on performing the training method detailed herein. Note that the training method disclosed represents an exemplary method of determining the path information used by the equalizer 130, but does not represent the only approach. The equalizer 130 uses path information, including magnitude, phase, and time offset information, to perform its multipath interference cancellation operations, and its operation is independent of how this information is determined. Techniques for determining this path information described herein are exemplary and provided as an aid in understanding the present invention. This configuration entails providing the equalizer 130 with a complex coefficient and corresponding delay information for each secondary path to be canceled from the received signal. The complex path coefficient represents a learned model of propagation path parameters for a given secondary path, while the delay information represents the arrival delay of the given secondary path relative to the main path signal arrival time. The training circuit 200, shown within baseband processor 170 (FIG. 5) and discussed in detail later, represents an exemplary circuit for practicing the training method described herein. Of course, other circuit implementations may provide similar functionality and can be used to similar effect.

Once configured, the equalizer 130 compensates the main path signal for multipath interference caused by the secondary signals. The compensated output from the equalizer 130 then passes to the despreading circuit 140, where signal correlation operations provide the baseband processor 170 with despread, received signal samples. The baseband processor 170 extracts the received data from these received signal samples.

Figure 5:
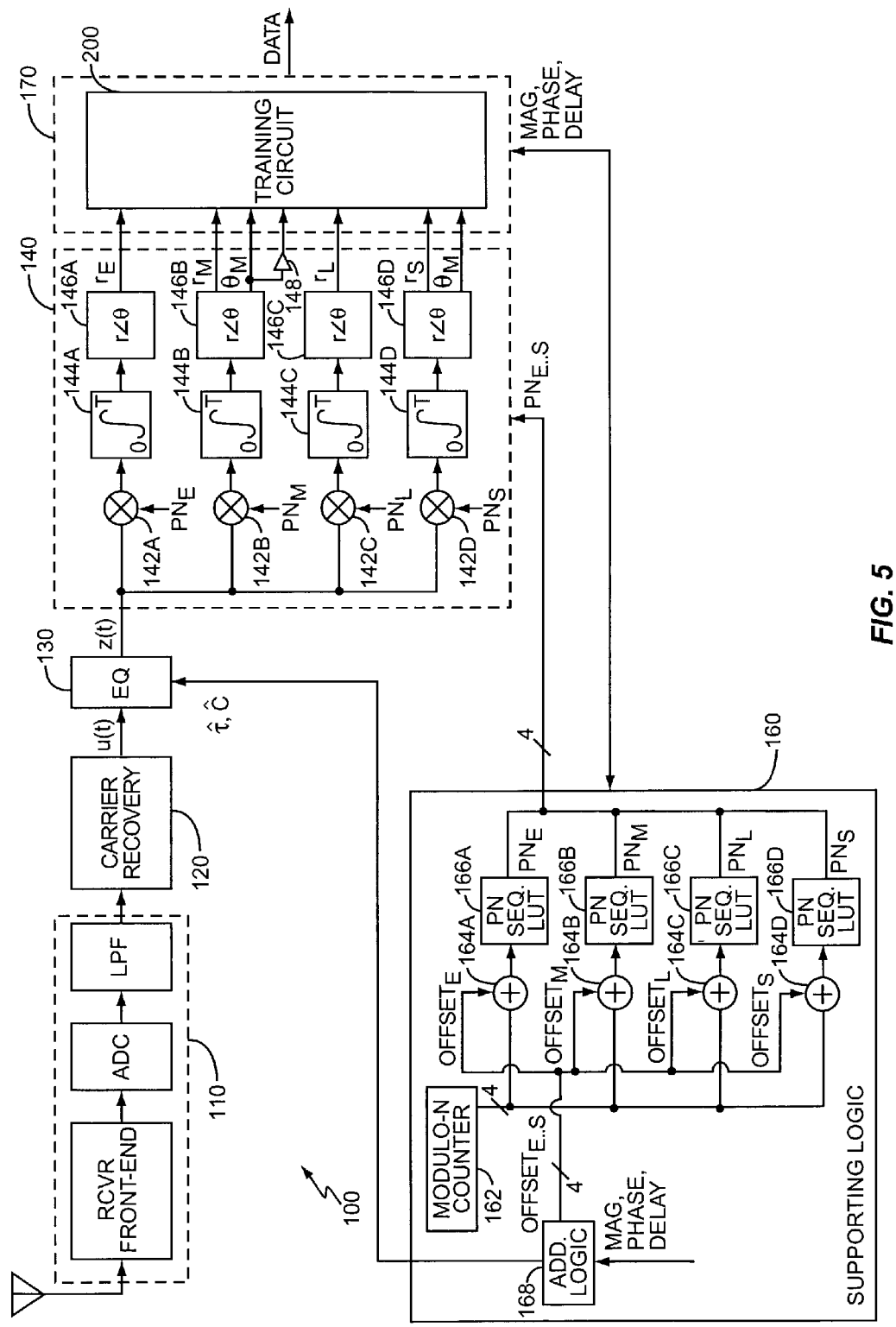
FIG. 5 is a more detailed functional block diagram of the communications receiver of FIG. 4.

FIG. 5 provides more details of the exemplary communications receiver 100 shown in FIG. 4. The conditioning/conversion block 110 includes a receiver front-end circuit, analog-to-digital converter, and a digital low-pass filter. The despreading circuit 140 includes four sets of despreading circuits, including a "main path" despreading circuit that includes a multiplier 142B, an integrator 144B, a coordinate translator 146B, and a phase slicer 148. Additional multipliers 142A and 142C in combination with integrators 144A and 144C and coordinate translators 146A and 146C, comprise "early" and "late" despreading circuits, respectively. Multiplier 142D, integrator 144D, and coordinate translator 146D combine to form a "secondary path" despreading circuit. The supporting logic circuit 160 includes a modulo-N counter 162, a set of offset adders 164A . . . D and a corresponding set of PN sequence look-up tables (LUTs) 166A . . . D. The supporting logic 160 also includes additional logic resources 168. A baseband processor 170 includes a training circuit 200 that is used to determine the secondary path propagation parameters that permit the equalizer 130 to cancel multipath interference in the received signal.

Generally, the received signal coming into the conditioning/conversion circuit 110 comprises both in-phase (I) and quadrature (Q) signals. These signals may be filtered and/or buffered in a front-end circuit before being converted from analog format into digitized I and Q sample streams by analog-to-digital converters. Subsequent to digital conversion, the I and Q samples may be low-pass filtered before leaving the conditioning/conversion circuit 110. The carrier recovery circuit 120 corrects for carrier frequency error, as previously described, and passes the digitized samples on to the equalizer 130. As will be discussed in more detail later, the equalizer 130 compensates the received signal samples for multipath interference once it has been properly configured.

In learning secondary path parameters, the training circuit 200 operates on the main path received signal and selected secondary path signals. Thus, the despreading circuit 140 is required to provide the training circuit 200 with one despread signal that is synchronized with the phase of the main path signal and one despread signal that is synchronized to the phase of a selected secondary path signal. These input signals represent successive sample values of magnitude and phase for the main path and selected secondary path signal. An understanding of the exemplary despreading circuit 140 illustrated in FIG. 5 is helpful in understanding how the secondary path propagation parameters are learned using training circuit 200. Note that the training associated with the present invention may be practiced with any type of circuit or system capable of providing magnitude and phase information for the main path and secondary path signals.

As explained earlier, DSSS receivers despread received signals using the same PN sequence that was used by a corresponding transmitter to spread the original narrowband information signal. For maximum correlation, the receiver's progression through the PN sequence must be exactly synchronized with the transmitter's PN sequence progression. That is, the instantaneous PN sequence value at the receiver must exactly match that of the transmitter for maximum correlation response. The modulo-N counter 162—which is a Modulo-44 counter in exemplary embodiments—included in supporting logic 160 provides a repeating count sequence used to sequentially select values from memory-based PN sequence look-up-tables (LUTs) 166A . . . 166D. The output PN sequences ($PN_E$, $PN_M$, $PN_L$, and $PN_S$) provided to the despreading circuit 140 are all based on a commonly selected PN sequence, but may have differing sequence offsets based on their respective index offset values (OFFSET$_E$, OFFSET$_M$, OFFSET$_L$, and OFFSET$_S$) feeding the offset multipliers 164A . . . 164D.

With the above information in mind, the set of four multipliers (correlators) 142A . . . 142D in the despreading circuit 140 are capable of despreading the received signal with up to four different despreading phases. In operation, the communications receiver 100 configures the supporting logic 160 such that OFFSET$_M$ sets the sequence offset of the "on-time" or main path sequence ($PN_M$) supplied to the multiplier 142B such that it is synchronized with the main path signal. This allows the despreading circuit 140 to provide the training circuit 200 with magnitude samples $r_M$ and phase samples $\theta_M$ corresponding to the main path signal. The communications receiver 100 adjusts the PN sequence offsets of $PN_E$ and $PN_L$ ($OFFSET_E$ and $OFFSET_L$) such that multipliers 142A and 142C despread the received signal with PN sequences adjusted to have a phase slightly earlier and slightly later than the main path PN sequence phase, respectively. However, these operations relate to maintaining synchronization with the main path signal, rather than to practicing the present invention, and are not further detailed herein.

In estimating secondary propagation path parameters for each of the secondary path signals of interest, the $OFFSET_S$ value is adjusted to synchronize the secondary path despreading circuitry in the despreading circuit 140 with selected ones of the secondary propagation path signals. This allows the communications receiver 100 to control the despreading circuit 140 to provide the training circuit 200 with magnitude and phase samples of the received signal synchronized, at different times during training, to each one of the secondary path signals for which cancellation is desired.

Figure 6:
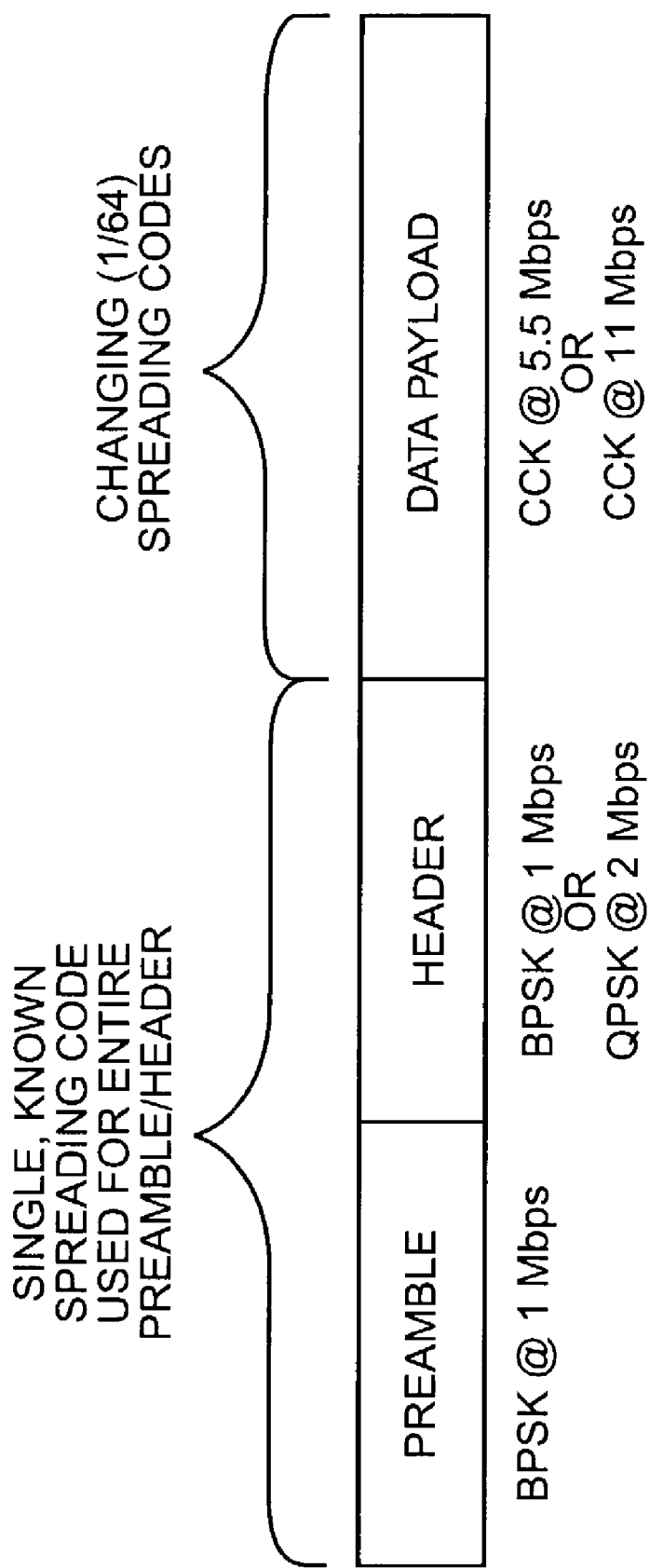
FIG. 6 illustrates the structure of an IEEE 802.11b wireless LAN data packet.

In 802.11b applications, the communications receiver 100 uses the training method described herein to configure the equalizer 130 to provide multipath interference cancellation in CCK-modulated received signals conforming to IEEE 802.11b standards. Understanding the structure of an 802.11b data packet is helpful in understanding exemplary training and cancellation operations. As illustrated in FIG. 6, 802.11b data packets comprise a preamble, a header, and a data payload. In standard 802.11 data packets, the preamble is transmitted at 1 Mbps using BPSK, while the header and payload may be transmitted at either 1 Mbps or 2 Mbps. At 2 Mbps, QPSK is used rather than BPSK. In 802.11b, modulation of the header and preamble remain the same, but the data payload is transmitted at 5.5 Mbps or 11 Mbps, with CCK modulation used in both cases.

In general, channel estimation may be supervised (both transmitted data and spreading code are known), blind (both transmitting data and spreading code are unknown), or semi-blind (spreading code is known but data is unknown). As one might guess, blind estimation represents the most difficult approach, while supervised estimation is the most straightforward. For 802.11b applications, the training method adopts semi-blind training techniques (based on the known spreading code applied to 802.11b preambles and headers) to develop appropriate coefficients for the equalizer 130.

The fixed spreading sequence applied to the preamble and header has good correlation properties that allow conventional 802.11 receivers to despread one or more path signals within a multipath signal arising from the transmission of the preamble and header without substantial interference from the other path signals, regardless of whether 802.11 or 802.11b is being used. This means that multipath cancellation (channel equalization) is typically not required during reception of the preamble and header portion of an 802.11b data packet. This allows the communications receiver 100 to characterize the secondary propagation paths' influence on the transmitted signal during the 802.11b preamble and header. This information is then used to configure the equalizer 130 to provide channel equalization during the CCK-modulated 802.11b payload, where multipath signal cancellation becomes necessary to avoid interference. In other words, the communications receiver 100 uses the training method during the preamble and header portion of each 802.11b data packet, taking advantage of the good correlation properties of the known spreading code applied to the preamble and header, to learn the multipath channel conditions prevailing for the current 802.11b data packet. During the preamble and header, the equalizer 130 is turned off—set to a flat frequency response—and then updated with the newly learned parameters for the current 802.11b packet.

As applied in 802.11b systems, training is such that path parameters for the major secondary path signals can be learned based on processing a relatively small number of received symbols—fewer than are contained in the standardized preamble and header. This allows the communications receiver 100 to determine the required path parameters and configure and then enable the equalizer 130 for active cancellation before the start of the high data rate 802.11b payload portion of the data packet. The information provided to the equalizer 130 for secondary signal cancellation is derived and updated during training, and then held fixed during the 802.11b packet payload. In short, the equalizer 130 is disabled during the preamble and header (while training is active) and then updated and enabled prior to the payload, and this action is repeated for each successive 802.11b data packet.

In communications systems, equalizers function essentially as filters that are tuned to the response of the radio channel. In a preferred system, the equalizer 130 produces estimates of the significant multipath reflections (secondary signals) of the main path signal based on learned propagation characteristics (magnitude, phase, and delay) for the secondary propagation paths associated with the radio channel. These reflection estimates are subtracted from the received signal, thereby providing cancellation of selected multipath signals included in the received signal. The training method detailed herein provides an advantageous technique for developing these secondary propagation path characteristics.

Ideally, a radio channel has a flat frequency response, meaning that it passes all frequencies of interest with uniform attenuation and phase shift. In reality, radio channels seldom exhibit this ideal behavior. Before training, the equalizer 130 is simply turned off—or, equivalently, set to a flat frequency response. After synchronizing the main path circuitry (carrier recovery circuit 120 and the main path despreading correlator included in despreading circuitry 140) with the main path signal, the communications receiver 100 individually synchronizes its secondary path circuitry (including the secondary path correlator of the despreading circuitry 140) with the secondary path signals in the accommodated delay spread range, extending both before and after the arrival of the main path signal, to determine the strongest secondary path signals. Preferably, the communications receiver 100 incorporates circuit resources supporting the operation introduced in FIGS. 7A through 7C, and more greatly detailed in FIG. 8.

FIG. 7A depicts a sequence of symbols ($S_1 \ldots S_N$) arriving at the communications receiver 100 via a main signal propagation path and a secondary signal propagation path. Each symbol block represents one symbol time or period, and the sequence of symbols received through the secondary path has an unknown delay relative to the sequence of symbols received via the main path. Secondary path delays may be less or more than one symbol period. In an actual multipath signal, some secondary signals will likely have delays falling within one symbol time of a given main path received symbol, while other secondary signals will have delays falling outside one symbol time.

FIG. 7B generally outlines training for a given secondary signal. In PSK transmission, symbols are conveyed using phase modulation. Thus, the numbers within the blocks comprising sequence 700 represent an exemplary sequence of ideally transmitted symbols (phase values). Note that these phase values are for illustration and may not correspond to phase values used in any actual PSK modulation scheme. The transmitted sequence 700 is received by the communications receiver 100 through a main signal path as a main sequence 710, and through a secondary signal path as a secondary sequence 720. For convenience, the secondary sequence 720 is illustrated offset from the main sequence 710 by one symbol period, but may take on any offset value in practice.

As received, the sequences 710 and 720 do not perfectly reflect the symbol phase values in transmitted sequence 700. While the main path symbols in sequence 710 are relatively close to the transmitted values in sequence 700, they exhibit some noise-induced differences. The secondary path symbols exhibit noise problems as well, but further exhibit a phase shift with respect to the main path symbols. As an example, sequence 720 is illustrated with a phase shift of approximately 30° with respect to sequence 710. So, for example, a transmitted symbol phase of 45° becomes 43° through the main path—due to noise—and, relative to the main path, becomes 76° through the secondary path—due to noise plus secondary path phase shift. For a given secondary signal path, this phase shift is essentially constant unless signal transmission conditions change.

To determine the correspondence, and hence the time offset between the main and secondary signals, the main path symbol phase values are first sliced or adjusted to their corresponding nominal phase values to form sequence 730, while the secondary path values are not modified. This removes phase noise from the individual main path samples. Since the phase values in the received secondary sequence 720 have an unknown phase shift compared to the values in the received main path sequence 710, they are not yet sliced. To remove this unknown phase shift, the secondary sequence 720 is differentially decoded to form the differential secondary sequence 750, and the sliced main sequence 730 is, for consistency, also differentially decoded to form the sliced, differential sequence 740. Once the unknown offset is removed, sequence 750 may be sliced to remove individual sample phase noise to form the differential, sliced secondary sequence 760.

At this point, individual phase sample values in sequence 740 may be compared with phase samples in sequence 760 to identify which phase sample in the secondary sequence 760 corresponds with which phase sample in the main sequence 740. As illustrated, corresponding values are shown in bold. Based on identifying this correspondence, training may then determine the path delay and phase shift for the secondary signal being processed. As shown, current main sequence values are compared to current and preceding secondary sequence values, and current secondary sequence values are compared with preceding main sequence values. As shown, these correlation operations are limited to adjacent symbols, but may be extended across additional symbols.

Once main and secondary path symbol correspondence is determined, as explained above, the unknown phase shift of the secondary path relative to the main path may be determined. Here, differential decoding is not used, so that the secondary path phase shift is preserved. Operating on sliced received main path symbol phase values and un-sliced secondary path symbol phase values (sequences 730 and 720, respectively, in FIG. 7B), the training method subtracts a preceding secondary phase value from a current main phase value, a current secondary phase value from the current main phase value, and the current secondary phase value from a preceding main phase value. Only one of these differences represents the actual phase shift of the secondary signal relative to the main signal. In the example outlined in FIG. 7B, the current secondary phase value corresponds to the preceding main phase value. FIG. 7C illustrates that the difference between the preceding main phase value and the current secondary phase value represents an estimate of the actual secondary-to-main phase shift. Of course, the range of main and secondary symbols used in the operations outlined in FIGS. 7B and 7C may be varied as needed to cover a broader range of delays.

FIG. 8 broadly presents an exemplary embodiment of the training method. The general process includes identifying the main propagation path signal and major (strongest) secondary propagation path signals, and learning propagation path characteristics for the secondary signals of interest, relative to the main propagation path signal. In the context of the communications receiver 100, this assumes the carrier recovery circuit 120 and despreading circuits 140 have performed initial synchronization with transmitted symbols received via the main path signal and continue tracking the main path signal during operation. Synchronization and tracking may be accomplished in a number of ways, and the specifics of how these are accomplished are not critical to understanding the training process. In this sense, however, FIG. 8 may be a simplification of the overall operating logic implemented in the communications receiver 100. Indeed, the communications receiver 100 may execute the logic outlined in FIG. 8 in the context of larger, more complex operating algorithms, and may represent operating logic executed concurrently with other operations.

Processing begins (block 810) with the assumption that a received signal sample stream synchronized with the main propagation path symbol timing and phase is available, this is referred to as the main path signal. Further, a received signal sample stream that may be selectively synchronized with individual secondary propagation path signals is also assumed to be available, and this is referred to as the secondary path signal. In exemplary embodiments, the secondary path signal is adjusted to "scan" over an entire spreading code phase range to identify secondary path signals—this process may be thought of as a "course" search. This may be done at various resolutions, with an exemplary embodiment adopting a secondary path phase step equal to ½ chip resolution. Thus, in exemplary embodiments, circuitry supporting the despreading of secondary path signals is adjusted to an initial PN code phase offset index (block 812).

The secondary path signal magnitude and PN code phase offset index for this initial setting are stored (block 814), and the PN code phase offset index is checked to insure that the code phase offset adjustment has not reached a maximum offset index value (block 816). Assuming it has not yet reached the maximum offset index value, the PN code phase offset is then adjusted such that the secondary path despreading circuitry adopts the next PN code phase offset setting (block 818) and the secondary signal magnitude and PN code phase offset are stored for this phase setting. Blocks 814 to 818 are repeated for each PN code phase offset setting, until the maximum code phase offset setting is reached (block 816), at which point processing advances to a point where the N strongest secondary path signals are identified, where the strongest multipath signal is the main path signal (block 820).

At this point, a set of multipath signal magnitudes exists, one for each corresponding phase offset index in the despreading PN sequence. These magnitude values correspond to individual signals contained in the received multipath signal, with each one representing the multipath signal being despread with a different phase index offset setting. In exemplary embodiments, the magnitude values are evaluated to identify the magnitude samples having the greatest and next-greatest magnitudes. The greatest magnitude value corresponds to the strongest of the multipath signals in the received multipath signal, deemed the main path signal, while the next-greatest magnitudes correspond to the significant secondary signals in the received multipath signal.

In exemplary embodiments, only the two strongest secondary path signals are characterized for cancellation (e.g., N=2), as these two secondary signals represent the main sources of multipath interference in the received signal. Other embodiments may provide cancellation for fewer or greater numbers of secondary (echo) signals. Essentially any number of secondary path signals may be selected and subsequently characterized with this method, but characterizing and canceling very weak secondary signals may provide little additional benefit.

With the N secondary path signals of interest identified, processing advances to the characterization portion of the training method. In exemplary embodiments of this method adapted to work in the context of multipath interference cancellation in 802.11b data packets, propagation path parameters for the selected secondary path signals are learned at the beginning (preamble/header) of each 802.11b data packet, and are characterized with respect to the main propagation path signal. The main propagation path signal may be considered to have a magnitude of 1, and a phase of 0. Thus, learning the parameters of the selected secondary path signals entails determining a complex coefficient that expresses the relative magnitude and phase of a given secondary path signal with respect to the normalized main path signal.

Parameterization of the secondary path signals additionally entails identifying the propagation path delay of each selected secondary path with respect to the main propagation path. These learned parameters may then be used to update the path coefficients and delays used by the equalizer 130. Based on the previously saved phase offset index value corresponding to the first secondary path of interest, the secondary path despreading circuit is synchronized with the first of the secondary path signals of interest (block 822). Received signal magnitude and phase samples for both the main path signal and the selected secondary path signal are accumulated over K symbols (blocks 824 and 828, respectively). While simultaneous acquisition of magnitude and phase sample information is depicted, some embodiments may employ non-simultaneous magnitude and phase processing.

With respect to magnitude, the accumulated samples are integrated to form $r_S$ and $r_M$, representing the secondary path signal magnitude integrated over M symbols and the main path signal magnitude integrated over the same M symbols, respectively. Using these values, the relative magnitude of the currently selected secondary path signal may be computed with respect to the main path signal, providing the value $r_i$ (block 826), which is stored for subsequent use.

Based on correlating differentially decoded phase values from previous, current, and succeeding main path and secondary path symbols, the training method identifies whether the current secondary path symbol arises from the current main path symbol, or if it is associated with a different main path symbol (block 830). With this information, the appropriate phase of the currently selected secondary path signal ($\theta_i$) may be determined with respect to the main path signal (block 832), and the delay offset of the currently selected secondary propagation path ($\tau_i$) may be determined with respect to the main path signal (block 834).

Thus, for the currently selected secondary path signal, the relative magnitude $r_i$, the relative phase $\theta_i$, and the path delay $\hat{\tau}_i$ are now estimated. The magnitude and phase information are combined to form a complex coefficient $\hat{C}_i$ that represents the magnitude and phase changes experienced by a signal transmitted via the currently selected secondary propagation path with respect to the main propagation path transmission (block 836). The training method assumes that the radio channel propagation path characteristics are constant over the duration of a single 802.11b data packet. Thus, this complex coefficient may be used in by the equalizer 130 in the cancellation of the currently selected secondary path signal during the payload portion of the current 802.11b data packet, and then updated at beginning of the next data packet. Of course, in other embodiments, training may be modified such that the equalizer 130 is updated and used in a manner that complements the requirements of other protocols or system configurations.

The learned parameters ($\hat{C}_i$, $\hat{\tau}_i$) for the currently selected secondary path signal are stored for subsequent use in other system operations (block 838). In an exemplary implementation, the communications receiver 100 provides these learned parameters to the equalizer 130 for use in its multipath interference cancellation operations. Other types of systems, such as previously discussed CDMA cellular telephone systems, may advantageously use the learned secondary path channel parameters as well. For example, a RAKE receiver may use the information to coherently combine individual RAKE fingers signals to form the RAKE receiver output.

Once the currently selected secondary path signal has been fully characterized, processing checks if there are any remaining secondary path signals of interest (block 840). If there are not, processing ends (block 844), otherwise the secondary path despreading circuitry is adjusted to synchronize with the next secondary path signal of interest (block 842), so that its path parameters may be similarly learned and stored (blocks 824 through 838).

The training circuit 200—introduced in FIG. 5—represents an advantageous circuit for implementing the exemplary training method used to determine secondary path characteristics. FIG. 9 provides more detail for an exemplary training circuit 200. As noted, the circuits comprising the training circuit 200 preferably are integrated with the communications receiver 100. In operation, the training circuit 200 receives a main path signal that remains synchronized to the strongest of the multipath signals, and a secondary path signal that is synchronized at different times with different ones of the secondary path signals. For reference in the subsequent discussion, variables associated with the main path signal will have an "M" subscript, while variables associated with the secondary path signals will have an "S" subscript.

As shown in FIG. 5, the communications receiver 100 adjusts the offset index ($OFFSET_M$) of the $PN_M$ sequence using adder 164B, which changes the code phase of the PN sequence provided to multiplier 142B, allowing it to synchronize with and despread the main path signal. Thus, $r_M$ and $\theta_M$ represent magnitude and phase sample values, respectively, of the main path signal. Secondary propagation path parameter estimation requires the communications receiver 100 to characterize a select number of secondary path signals with respect to the main path signal. The number of secondary path signals that are characterized during training depends upon specific design and operating requirements. Those skilled in the art will readily appreciate that the training method may be varied in this and in other respects. Exemplary embodiments process the secondary path signals to identify the two strongest secondary path signals, with these strongest signals referred to as the secondary path signals of interest.

The communications receiver 100 varies the offset index (OFFSET$_S$) of the secondary path PN sequence (PN$_S$) using adder 164D, which changes the code phase of the PN sequence provided to the secondary signal despreading circuitry (including multiplier 142D) in the despreading circuit 140. This allows the despreading circuit 140 to selectively synchronize with each secondary signal. Each offset change in the PN$_S$ sequence supplied to the despreading circuit 140 effectively results in despreading the received signal with a different time delay relative to the main path signal timing. Essentially, the communications receiver 100 sets the offset of the PN$_S$ sequence and monitors the magnitude of $r_S$. In exemplary embodiments, it performs this operation at half-chip resolution over an entire PN code phase cycle relative to the main path symbol timing. By recording the phase settings (index offsets) that result in the greatest magnitudes for $r_S$, the communications receiver 100 identifies the main path signal and the strongest secondary signals.

After performing this course search for the main path signal and major secondary path signals, it is necessary to estimate the propagation path parameters and delay for each secondary path of interest. The training circuit 200 provides an economical and processing-efficient manner of accomplishing this goal. As shown in FIG. 9, the training circuit 200 may be thought of as comprising an upper branch, fed by $\theta_M$ (main path received symbol phase modulation sample values) and including summing node 208, and a lower branch fed by $\theta_S$ (secondary path received symbol phase modulation sample values) and including summing node 210. The upper branch operates on the despread main path signal, while the lower branch operates on the selected despread secondary signal to which the despreading circuitry 140 is currently synchronized. The combined operation of the upper and lower branches of training circuit 200 provides estimations for magnitude r, phase θ, and delay d, for each secondary path signal of interest relative to the main path signal.

The following operations are repeated for each secondary signal of interest. The PN$_S$ sequence offset is set such that the despreading circuitry 140 de-spreads the desired secondary path signal—each of the required PN$_S$ sequence offsets corresponding to the secondary signals of interest identified during the course search. The symbol magnitudes for $r_M$ and $r_S$ are accumulated for K symbols and then compared in the relative magnitude circuit 204. For example, main and secondary path symbols may be accumulated or integrated in integrators 202A and 202B, respectively. The magnitude for the current secondary signal of interest relative to the main path signal is estimated based on dividing the K-sum of $r_S$ over $r_M$. The training circuit 200 provides this estimated relative magnitude "r" as an output value that is used in estimating the secondary propagation path coefficient associated with the current secondary signal. At this point, the relative magnitude for the current secondary signal of interest has been estimated.

The hard-slicer 148 included in the despreading circuit 140 slices the main path signal phase samples according to the modulation constellation before they are input to the upper branch of the training circuit 200 as $\theta_M$. Hard-slicing entails adjusting or changing the actual phase value to the closest matching one of a defined set of nominal phase values—essentially, this removes noise from the phase sample. To provide differential decoding for the main path phase samples $\theta_M$, the training circuit 200 includes the delay element 206A, which provides the sliced main path phase sample of the preceding symbol to the inverting input of the summing node 208.

The summing node 208 outputs the difference between the current and previous main path symbols' sliced phase values. The sliced phase of the main path signal is the phase modulation value of the current data symbol subject to possible decision error (the slicing operation). Because the secondary path imposes an unknown phase change on the phase of the current secondary path data symbol ($\theta_S$), the $\theta_S$ phase values are differentially decoded using the delay element 206B and the summing node 210 before hard slicing. The summing node 210 outputs the difference between the current secondary path data symbol's phase and that of the previous symbol.

The received phase of the secondary signal consists of the phase modulation value of the current secondary path data symbol and the channel phase delay of the secondary propagation path. Therefore, the phase delay of the secondary path relative to the main path can be estimated by subtracting the sliced phase of the main path from the received phase of the secondary path. For near post-cursor delay (within a symbol time), the subtraction of phase values $\theta_M$ and $\theta_S$ is performed immediately on the current main and secondary path data symbols using summing node 216, with the result labeled $\theta_1$.

For pre-cursor delay, the phase delay between the main path signal and the current secondary path signal is estimated based on subtracting the current main path symbol's phase value from the phase value of the preceding secondary path symbol using summing node 214, with the result labeled $\theta_0$. For far post-cursor delay (delay exceeding one symbol time), the phase delay between the main path and the current secondary path is estimated based on subtracting the phase value of the preceding main path symbol from the phase value of the current secondary path symbol using summing node 218, with the result labeled $\theta_2$.

In order to determine which main-to-secondary path relative phase value to use ($\theta_0$, $\theta_1$, or $\theta_2$), the communications receiver 100 must know whether the current secondary signal arises from pre-cursor, or near or far post-cursor echo signal interference. The training circuit 200 provides this information by evaluating the cross-correlation between the main path symbol decision and the current secondary path symbol decision (the hard-sliced, differentially decoded values of $\theta_M$ and $\theta_S$) using a sequence of R received symbols. The cross-correlation is performed, in this exemplary embodiment, with relative lags of −1, 0, and +1 symbols, corresponding to pre-cursor, near post-cursor, and far post-cursor delays, respectively. Differentially decoding the secondary path symbols substantially removes any phase shift relative to the main path induced in the transmitted symbols received through the currently selected secondary propagation path. This results from the secondary path phase change being an essentially constant value that is removed through subtraction. The main path symbols are differentially decoded for consistency of operations in the main-to-secondary path comparison processing.

The summing node 224 provides as its output the difference between the differentially decoded, hard-sliced phase value of the current main path symbol and the differentially decoded, hard-sliced phase value of the previous secondary path symbol. The integrator 230 integrates the absolute value of this signal over R symbols. The summing node 226 provides as its output the difference between the differentially decoded, hard-sliced phase value of the current main path symbol and the differentially decoded, hard-sliced phase value of the current secondary path symbol. The integrator 232 integrates the absolute value of this signal over R symbols. The summing node 228 provides as its output the difference between the differentially decoded, hard-sliced phase value of the previous main path symbol and the differentially decoded, hard-sliced phase value of the current secondary path symbol. The integrator 234 integrates the absolute value of this signal over R symbols.

As a result of the phase-domain operations, the maximum correlation of symbols translates to a minimum value (ideally zero) of phase, where minimum phase corresponds to a maximum real component. The minimum picker circuit 236 operates on the output from each of the integrators 230, 232, and 234 to determine which of the integrated signals exhibits the lowest value. The earlier, so-called course search identified the time offset (PN code phase offset index) of each secondary path signal of interest within a symbol time with respect to the main path signal, but could not provide information about actual secondary path time offset (potentially more than a symbol time) without pre/post-cursor information.

With the correlation results from the minimum picker circuit 236, an estimate of the actual secondary path delay for the currently selected secondary path is available. Thus, the output of the minimum picker circuit 236 may be used to set the appropriate equalizer shift register tap offset value ($\hat{\tau}$ in FIGS. 11 and 12), and is further used to set the phase select circuit 220 such that it provides the appropriate phase output ($\theta_0$, $\theta_1$, or $\theta_2$). In operation, the equalizer 130 maintains a running buffer of the last N most recent hard-sliced phase samples (hard-decision values) corresponding to the past N received signal samples. Since each successive stage (tap) in shift register 330 (FIGS. 11 and 12) corresponds to a successively longer sample time offset delay with respect to the current received signal sample, $\hat{\tau}$ is set for a given path coefficient $\hat{C}$ such that the corresponding shift register 330 tap delay matches or substantially matches the calculated secondary propagation path delay.

Upon completion of these operations, the communications receiver 100, based on practicing an exemplary embodiment of the training method, has determined the required magnitude, phase, and offset (delay) information necessary to configure the equalizer 130 to provide cancellation of the currently selected secondary path signal. More specifically, the communications receiver 100 has the information necessary to estimate the complex coefficient ($\hat{C}$) for the current secondary propagation path. The above process is repeated for each secondary path of interest.

FIGS. 10A and 10B illustrate both the I and Q components and the QPSK constellation of a typical pulse-shaped CCK signal waveform as is used in the 802.11(b) environment. In order to meet bandwidth and other spectrum requirements, the CCK signal waveform is no longer square-shaped, and the equalizer 130 must recreate the pulse-shaped CCK signal waveform, as shown in FIG. 10A, of the secondary path signals using additional logic or circuitry in addition to the complex coefficient derived in the training circuit 200. Further, FIG. 10B illustrates the QPSK constellation used in a typical 802.11(b) environment, wherein the I component may be either 1 or −1 and the Q component may be either j or −j.

FIG. 11 illustrates a generalized exemplary embodiment for the equalizer 130 of the present invention. Preferably, the equalizer 130 is included within the communications receiver 100. Operating on chip or sub-chip resolution input samples u(t), the equalizer 130 provides pre-cursor and/or post-cursor multipath signal cancellation based on compensating the input samples with secondary signal estimates. Once propagation path parameters are determined—the appropriate estimated delay register tap values ($\hat{\tau}_{21} \ldots \hat{\tau}_{2L}$ and $\hat{\tau}_{11} \ldots \hat{\tau}_{1N}$) and complex estimated coefficients ($\hat{C}_{21} \ldots \hat{C}_{2L}$ and $\hat{C}_{11} \ldots \hat{C}_{1N}$) must be set first—the equalizer 130 compensates received signal samples output from the carrier recovery circuit 120 by canceling out interfering secondary signals caused by multipath phenomena. These compensated received signal samples are output from the equalizer 130 and serve as the input samples to the despreading circuits 140. Thus, once the equalizer 130 is set and activated, the despreading circuits 140 and subsequent baseband processing circuits 170 operate on received signal samples from which the equalizer 130 has canceled the major multipath interference.

As illustrated in FIG. 11, the equalizer 130 includes a compensated sample shift register 320, a sliced sample shift register 330, a hard slicer 310, a post-cursor cancellation summing node 302, a pre-cursor cancellation summing node 304, a post-cursor estimated multipath signal summing node 308, a pre-cursor estimated multipath signal summing node 306, a buffer interface 316 for receiving secondary path delay information and retrieving selected values from the register 330, scaling logic 332 for operating on selected values from the register 330 to form a scaling factor associated with each hard-decision value, and memory and calculation elements 312 and 314 for storing and operating on post- and pre-cursor estimated secondary propagation path coefficients $\hat{C}_{11} \ldots \hat{C}_{1N}$ and $\hat{C}_{21} \ldots \hat{C}_{2L}$, respectively. The equalizer 130 provides cancellation for up to N post-cursor multipath signals and up to L pre-cursor multipath signals. The equalizer 130 may be modified to vary N and L based on specific design needs. Indeed, the equalizer 130 may be implemented with just pre-cursor multipath cancellation, or with just post-cursor multipath cancellation.

In operation, the post-cursor cancellation summing node 302 operates as a post-cursor compensation circuit by subtracting a current post-cursor secondary signal estimate from a current input sample. Similarly, the pre-cursor cancellation node 304 operates as a pre-cursor compensation circuit by subtracting a current pre-cursor secondary signal from a current delayed sample. The scaling logic 332 provides scaling factors for each current hard-decision value based on the hard-decision values immediately preceding and following the current value.

To illustrate one embodiment of the scaling logic, consider using the scaling logic 332 for determining a scaling factor for a single hard-decision value of a QPSK secondary path signal. The scaling logic 332 first selects the one hard-decision value immediately preceding the current value (early value) in the register 330 and the one hard-decision value immediately following the current value (later value) in the register 330. The scaling logic 332 then examines these three hard-decision values. If the hard-decision value of the QPSK jumps to an opposite point in the QPSK constellation of FIG. 10B (shifts 180 degrees) from the early to later value, a chip transition with sign changes for both I and Q has occurred, and the scaling factor is zero (0). If the hard-decision values remain constant (shifts 0 degrees) from early to later values, then the current hard-decision value is either inside a chip or between two consecutive chips with the same value, and the scaling factor is 1 (unity scaling factor). If the hard-decision values shifts to a neighboring point in the QPSK constellation of FIG. 10B (shifts 90 degrees) from early to later values, then a transition with both I and Q values shifting to or from 0 has occurred, and the scaling factor is ½. The exact logic used by the scaling logic could vary from the above example and should not be considered outside the scope of the present invention. Further, the number of early and later values used by the scaling logic can be increased in order to meet the changing design requirements and changing this number should not be considered outside the scope of the present invention.

Memory and calculation elements 312 and the output of the scaling logic 332 are combined at the first, second, and third post-cursor multiplication circuits 334, 336, and 338, respectively. In the preferred embodiment, each of the multiplication circuits 334, 336, and 338 performs multiplication of the output of the memory and calculation elements 312 and the scaling logic 332 using a low-cost multiplication. As an example of using this low-cost multiplication, the output of the memory and calculation elements 312 may be multiplied by a scaling factor of ½ by shifting each bit of the output of the memory and calculation elements 312 to the right by one bit. The number of post-cursor multiplication circuits used in the equalizer 130 of the present invention depends on the number of secondary signals for which cancellation is desired, and the number of multiplication circuits can change depending on the desired level of system performance, and any number of multiplication circuits (and secondary signals) should be considered within the scope of the present invention. The output of the multiplication circuits 334, 336, and 338 are combined at summing node 308 to provide the current post-cursor secondary signal estimate using the received path coefficients and selected hard-decision values—also referred to as nominal phase values or sliced samples—stored in register 330. Similarly, memory and operation elements 314, the scaling logic 332, and pre-cursor multiplication circuits 340 and 342 are used in combination with summing node 306 to provide the current pre-cursor secondary signal estimate. Buffer interface 316 provides selective connections between output taps on the successive stages of register 330 and the memory and calculation elements 312 and 314, and also provides connections to the scaling logic 332. Therefore, based on the delay values included in the received path delay information ($\hat{\tau}_{11} \ldots \hat{\tau}_{1M}$ and $\hat{\tau}_{21} \ldots \hat{\tau}_{2L}$), the buffer interface 316 provides selective connections to specific register stages to provide the current contents of the selected register stages to the memory and operation elements 312 and 314, and also provide the early, current, and later hard-decision values to the scaling logic 332.

In a further feature of operation, note that the maximum delay offsets between pre- and post-cursor multipath signals and the main path signal which can be handled by the equalizer 130 are limited only by the delay capability for sliced samples (hard decision values) and input samples (or compensated samples). In the exemplary illustration, the lengths of shift register 320 (length d) and shift register 330 (length D) determine these delay capabilities, respectively. Thus, the range of multipath signal delay spread accommodated by the equalizer 130 may be easily adjusted in a given design without changing its structure or operation. This flexibility imparts significant design and operation convenience, as well as economic advantage.

The input signal u(t) represents the output from the carrier recovery circuit 120. The signal u(t) comprises multi-bit complex values (real and imaginary) representing discrete, synchronized samples of the received signal taken at chip or sub-chip resolution. The u(t) samples include multipath interference. The equalizer 130 provides multipath interference cancellation based on applying hard-decision logic to the actual phase value of each input sample of u(t) (chip or sub-chip) to form a sliced sample, or hard-decision value. Preferably, a given input sample is compensated for post-cursor secondary signal interference before hard-slicing, but other embodiments of the equalizer 130 may perform hard slicing before or after pre- or post-cursor compensation. For example, in DSSS using QPSK, or in 802.11b payload data using CCK, each received symbol or chip takes a symbol value on a QPSK constellation, and the hard-decision may be made by hard-slicing the phase of the received sample in u(t). To cancel post-cursor multipath interference, the hard-sliced chip (or sub-chip) decision(s) is fed back with the proper delay(s) (e.g., $\tau_{1i}$) and multiplicand coefficient(s) (e.g., $C_{1i}$) for subtraction from u(t) in summing node 302. This aspect of operation is conceptually similar to more conventional Decision Feedback Equalizers (DFE), which are well understood in the art.

Looking specifically at post-cursor multipath interference, we can represent the received samples (chip or sub-chip resolution) in u(t) as the sum of the main path signal s(t), which is defined as the signal with the greatest magnitude, and post-cursor secondary path signals with delays $\tau_{1i}$ and corresponding complex coefficients $C_{1i}$ (with $|C_{1i}| \leq 1$). From this perspective, we may represent the received signal samples comprising u(t) as $$r(t) = s(t) + \sum_i C_{1i} s(t - \tau_{1i}) \cdot p(t - \tau_{1i})$$

Thus, the output y(t) from post-cursor cancellation summing node 302 may be represented as u(t) minus the estimated post-cursor multipath signals as follows, $$y(t) = r(t) - \sum_i \hat{C}_{1i} \hat{s}(t - \hat{\tau}_{1i}) \cdot \hat{p}(t - \hat{\tau}_{1i})$$

Where $\hat{C}_{1i}$ and $\hat{\tau}_{1i}$ are the estimated complex secondary path coefficients and corresponding secondary propagation path delay estimates, respectively, developed during training, and where ŝ(t) is the hard-sliced sample decision given by ŝ(t)=slice[y(t)]. Note that the slicer 310 performs its hard-decision slicing operation after cancellation of post-cursor multipath signals. In addition, p̂t( ) is the output of the scaling logic 332.

Note that the number of shift register stages comprising the sliced sample shift register 330 combined with the input sample resolution (chip or sub-chip) determines the maximum multipath signal delay accommodated by the structure of the equalizer 130. As illustrated, shift register 330 has D stages. This provides the equalizer 130 with the ability to cancel post-cursor multipath signals offset from the main path signal by up to (D−1)/x chip times, where x represents the sample resolution of u(t)—that is, the number of samples per chip in u(t). As an example, assume that u(t) is at half-chip resolution, or two samples per received DSSS chip, and further assume D−1=32 stages. With these values, the equalizer 130 accommodates multipath delays up to 32/2 or 16 chip times. In 802.11b CCK-mode transmissions, this equates to two symbol periods of multipath delay capability (CCK modulation uses 8 chips per symbol in 802.11b). In general, the maximum post-cursor secondary signal delay that can be accommodated by equalizer 130 is given by $(D-1)*T_S$, where D equals the number of sequential buffer positions or register stages, as explained above, and $T_S$ equals the input sample rate (sample period) associated with the input samples received from the multipath signal. Note that as shown in FIG. 12, when the equalizer 130 includes the optional decimation block 301, the communications receiver 100 may provide configuration information to the equalizer 130 such that it decimates the input samples, thereby adjusting $T_S$ to a desired input sample rate.

Pre-cursor multipath delay cancellation requires sample shift register 320 and the corresponding pre-cursor multipath cancellation summing node 304. In pre-cursor multipath interference, the echo signal arrives before the main path signal, thus the $\tau_{2i}$ values are negative. The length d of shift register 320 determines the maximum pre-cursor multipath delay accommodated by the equalizer 130, in a manner similar to that explained for post-cursor delay capability. With depth d=8 and at 2 samples-per-chip input resolution, the equalizer 130 provides multipath cancellation for pre-cursor signals delayed from the main path signal by up to 8/2 or 4 chip times. Of course, pre- and post-cursor delay handling capability may be easily adjusted to suit the needs of a specific application simply by altering the length of either or both the shift registers 320 and 330.

Focusing now on an expression for the input signal y(t–d) only in the context of pre-cursor multipath interference—ignoring any post-cursor cancellation operation performed on u(t) to form y(t)—we can express y(t–d) as, $$y(t-d) = s(t-d) + \sum_i C_{2i} s(t-(\tau_{2i}+d)) \cdot p(t-((\tau_{2i}+d))$$

Thus, the output z(t) from the pre-cursor cancellation summing node 304 may be represented as y(t–d) minus the estimated pre-cursor multipath signals as follows, $$z(t) = y(t-d) - \sum_i \hat{C}_{2i} \hat{s}(t-(\hat{\tau}_{2i}-d)) \cdot \hat{p}(t-(\hat{\tau}_{2i}-d)),$$

where $\hat{C}_{2i}$ and $\hat{\tau}_{2i}$ are the complex coefficient estimates and delay estimates developed during equalizer training, ŝ(t) is the hard-sliced sample decision, ŝ(t)=slice[y(t)], and p̂t( ) is the output of the scaling logic 332.

The equalizer 130 advantageously avoids complex multiplications regarding the hard-sliced samples ŝ(t) held in shift register 330 and the estimated complex coefficients $\hat{C}_{1i}$ and $\hat{C}_{2i}$. Rather than multiplying the ŝ(t) sample held in a particular shift register stage by one of the estimated coefficients ($\hat{C}_{1i}$ or $\hat{C}_{2i}$), the hard-sliced value of ŝ(t) is used to simply "rotate" the phase of the complex coefficient, thus nominal phase values (hard-sliced values) are used to adjust the phase of the complex coefficients.

Hard-slicing the y(t) samples with the slicer 310 produces sliced samples ŝ(t) from which the noise is removed. The operation of the slicer 310 produces output samples having one of a defined set of values corresponding to the constellation points defined by the communications system modulation scheme. For example, in an 802.11b CCK scheme, the slicer 310 operates as a QPSK slicer, processing the y(t) samples to produce ŝ(t) output samples having the closest matching ideal QPSK constellation values (namely, ±1, or ±j). Thus, the feedback (feedforward) signals for post-cursor (pre-cursor) multipath signal cancellation represent the ideal estimated multipath signal, rather than the estimated multipath signal+sample noise. This avoids adding noise in the feedback or feedforward signals with the instantaneous noise in the current u(t) or y(t–d) sample values.

FIG. 12 illustrates an exemplary implementation of the equalizer 130 designed for multipath signal cancellation in an 802.11b environment. In exemplary embodiments of the communications receiver 100, the received DSSS/PSK signal is converted from analog-to-digital format at 5 bits of resolution, but the particular resolution used is not critical to practicing the present invention. Continuing the 802.11b example, the input to the equalizer 130 comprises complex digital values representing quarter chip samples of QPSK-modulated chips at 8 chips per symbol. (This corresponds to the CCK-modulated payload data of an 802.11b data packet and assumes that the equalizer 130 has already been trained—configured using parameters learned via training—during the lower data rate header/preamble portions of the 802.11b packet.) Thus, u(t) represents a stream of 5-bit complex signal samples, which, in an exemplary embodiment, are taken at quarter-chip resolution (4 samples per received QPSK-modulated chip) and represent a sampling rate of 44 MHz.

As shown in FIG. 12, the equalizer 130 includes the previously mentioned optional decimation block 301 on its input to adjust its sampling rate to be compatible with a wide range of input sample resolutions. The decimation block 301 may be configured to decimate the input signal u(t) as required to provide u(t)' having the desired sample resolution (chip or sub-chip). Decimation may be adjusted by the communications receiver to support a desired input sample resolution. As illustrated, decimation block 301 decimates the quarter-chip resolution input signal u(t) by a factor of two to form the half-chip resolution input signal u(t)' with a sample rate of 22 MHz. Note that the equalizer 130, as depicted in FIG. 12, provides multipath signal compensation for two post-cursor echo signals or one post- and one pre-cursor echo signal. Note that registers 320 and 330 update at a rate determined by a buffer clock signal that is proportional to the input sample rate of samples received from the multipath signal. This update rate is further adjusted such that the registers 320 and 330 update (shift) compensated samples and nominal phase values (hard-decision values), respectively, at a rate matched to the operation of the optional decimation block 301 if that block is present and active.

Operation of the equalizer 130 depicted in FIG. 12 is consistent with the discussion relating to FIG. 11. The equalizer 130 uses the sliced sample register 330 to store hard-decision values and, in combination with the summing circuit 302, to provide post-cursor multipath signal cancellation. As illustrated, the feedback paths including complex coefficients $C_1$ and $C_2$ and scaling logic 332 provide for cancellation of up to two post-cursor multipath signals. The post-cursor delay offsets $\tau_1$ and $\tau_2$ correspond to the delay offsets between main path and post-cursor multipath signals as determined during equalizer training.

FIG. 12 also illustrates cancellation capability for one pre-cursor multipath signal, based on using the sample shift register 320 and the corresponding summing node 304. As illustrated, the feed-forward path including the complex coefficient $\hat{C}_3$ and scaling logic 332 provides for cancellation of a single pre-cursor multipath signal. The novel structure of the equalizer 130 allows deletion of pre-cursor multipath cancellation by eliminating the shift register 320 and the summing circuit 304 without interfering with the basic post-cursor cancellation structure.

The half-chip resolution complex samples u(t)' are compensated for post-cursor multipath interference in summing circuit 302. For example, assume that equalizer training identified a post-cursor multipath signal offset from the main path signal by one-and-a-half (1.5) chip times as the secondary event, and further identified a pre-cursor multipath signal offset by two-and-a-half (2.5) chip times from the main path signal as the tertiary event. With a 2-chips-per-sample shift rate, $\hat{\tau}_3=4-9=-5$, which represents the offset (4) into the sliced sample register 330 minus the depth (9) of the delayed sample register 320 required to provide 2.5 chip times of pre-cursor delay. Continuing the example, the supporting logic 160 in conjunction with the baseband processor 170 sets the estimated complex coefficients $\hat{C}_1$ and $\hat{C}_3$ and estimated offset delays $\hat{\tau}_1$ and $\hat{\tau}_3$ by methods earlier described; $\hat{C}_2$ and $\hat{\tau}_2$ would not be used in this specific example. For the $i^{th}$ u(t)' input sample, the ($i^{th}$–3) delayed sample ($\hat{\tau}_1$=3) is scaled by scaling logic 332 and "subtracted" from the input sample, thereby canceling the secondary multipath event corresponding to this secondary propagation path delay. As earlier explained, the complex coefficients are phase rotated based on the hard-sliced sample value contained in the shift register stage corresponding to delays ($\hat{\tau}$) associated with the coefficients and multiplied by a scaling factor, which is produced by the scaling logic 332 and derived from early and later values of hard-decision values contained in the shift register stage, to produce the estimated secondary path signal. This estimated secondary path signal is then subtracted from u(t)' or y(t–d).

Actual radio channel characteristics, required bit rates, and communications system requirements determine the optimal structure of the equalizer 130 in specific designs. FIG. 11 illustrates a generalized realization of the equalizer 130 preferably included within the communications receiver 100, while FIG. 12 provides a more specific example in the context of 802.11b CCK-mode multipath signal interference cancellation. FIG. 12 corresponds to an embodiment of the training method wherein only the two strongest multipath signals are canceled—either two post-cursor or one pre-cursor and one post-cursor echo signal.

Note that operating with a greater number of samples per chip provides better multipath delay resolution, but requires greater shift register depth to provide the same multipath signal delay spread capability. Those skilled in the art will recognize that shift register depth must be balanced against multipath event time resolution based on individual design requirements. The equalizer 130 easily accommodates such design-specific changes without requiring structural changes. More specifically, the need for increased or decreased multipath signal delay capability may be handled by simply adjusting the length of shift registers 320 and 330.

Because post-cursor multipath delay ranges can be much longer than pre-cursor multipath delay ranges, there is a real advantage in extending the length of the post-cursor cancellation shift register 330 well beyond that of the pre-cursor cancellation shift register 320. If the full bit resolution of the individual complex samples (sub-chip or chip samples) was used for the post-cursor cancellation shift register 330, an extended length shift register, as is required for spanning multi-symbol delays, would consume considerable circuit resources because of the need to store full-resolution samples (e.g., 12 bits) rather than reduced-resolution samples. For example, hard-slicing the y(t) samples to produce the hard-decision values (ŝ(t) samples) reduces the required width of shift register 330 to just two bits for QPSK signals, to represent the 1-of-4 nominal phase values used in QPSK modulation. (In general, hard-slicing reduces the sliced samples to n bits where $2^n$=M in M-ary modulation schemes.)

The equalizer 130 of the present invention offers substantial opportunity for variation without departing from the spirit and scope of the invention. For example, the number of pre- and post-cursor secondary signals that may be canceled by the equalizer 130 may be varied as needed in a particular communications system. In operation, the equalizer 130 may be configured with any number of path coefficients and associated time offsets (delays) up to a maximum number supported in a given equalizer configuration. While exemplary embodiments of the equalizer intended for use in 802.11b communications receivers provide cancellation for two secondary signals, two post-cursor, or one pre- and one post-cursor, other embodiments may cancel fewer or greater numbers of secondary signals. Further, other embodiments of the equalizer may be implemented with only pre-cursor cancellation or only post-cursor cancellation.

In addition, the scaling logic 332 of the equalizer 130 of the present invention has many variations, each of which should be considered within the spirit and scope of the invention. For example, any number of earlier and later hard-decision values could be used by the scaling logic to determine the scaling factor. Also, the actual logic implemented by the scaling logic depends on the modulation scheme of the received multipath signal and could be varied, and any variation should be considered within the spirit and scope of the invention. Further, the scaling factors produced by the scaling logic 332 are either 0, ½, or 1 in the preferred embodiment, but the number of scaling factors used and their exact values could be varied and still remain within the spirit and scope of the invention.

As noted, the resolution of the equalizer 130—the smallest time offset from the main path signal at which a secondary signal may be cancelled—depends upon the input sample rate, which is preferably at chip or sub-chip resolution. For a given sample rate, the depth of registers 320 and 330 determine the maximum multipath delay spread of pre- and post-cursor secondary path signals accommodated by the equalizer 130. For a given register depth, a courser input sample resolution extends the multipath delay spread range, while finer resolution samples decrease the delay spread range. The decimation block 301, optionally included in the equalizer 130, may be adjusted by the associated communications system to adapt the input sample rate to a desired resolution. Note also that compensated samples and hard-sliced samples are delayed using shift registers 320 and 330 as shown in the supporting drawings, but the structure implied by these illustrations should not be construed as limiting. In general, the hard-sliced samples and the compensated samples may be delayed using any buffer structure providing delayed access to the buffered samples.

While exemplary embodiments of the equalizer 130 provide multipath signal compensation in 802.11b wireless LAN environments, the flexible and economical architecture of the equalizer 130 allows it to be used in a variety of communications systems. Indeed, any spread-spectrum communications receiver operating in the presence of multipath interference may improve reception performance using the present invention.

The foregoing details should, in all respects, be considered as exemplary rather than as limiting. The present invention allows significant flexibility in terms of implementation and operation. Examples of such variation are discussed in some detail above; however, such examples should not be construed as limiting the range of variations falling within the scope of the present invention. The scope of the present invention is limited only by the claims appended hereto, and all embodiments falling within the meaning and equivalency of those claims are embraced herein.

Those skilled in the art will recognize improvements and modifications to the preferred embodiments of the present invention. All such improvements and modifications are considered within the scope of the concepts disclosed herein and the claims that follow.

What is claimed is:

1. An apparatus comprising:
   a) a compensation circuit adapted to receive input samples from a received multipath signal and compensate the input samples using secondary signal estimates to form compensated samples;
   b) a hard-decision circuit adapted to receive the compensated samples and determine a nominal phase value for each input sample, wherein said hard-decision circuit outputs a selected one from a defined set of nominal phase values as the nominal phase value;
   c) a buffer circuit adapted to receive the nominal phase value from said hard-decision circuit and maintain a running sequence of past nominal phase values in successive buffer positions corresponding to successively greater sample time offsets with respect to the current input sample;
   d) a buffer interface circuit adapted to receive path delay information corresponding to a secondary path signal and provide a selected past nominal phase value, one or more early nominal phase values, and one or more later nominal phase values by retrieving the past nominal phase value currently held in one of said buffer positions corresponding to a sample time offset equal to the received path delay information and further retrieving the one or more early nominal phase values from one or more of said buffer positions which precede said buffer position corresponding to the sample time offset and the one or more later nominal phase values from one or more of said buffer positions which follow said buffer position corresponding to the sample time offset; and
   e) an estimation circuit comprising
      i) memory and calculation logic adapted to receive the selected past nominal phase value selected from said buffer interface circuit, receive and store magnitude and phase information corresponding to the secondary path signal in the received multipath signal, and produce an unscaled secondary signal estimate for a current input sample based on the magnitude and phase information and the past nominal phase value derived from prior input samples;
      ii) scaling logic adapted to produce a scaling factor based on the one or more early nominal phase values and the one or more later nominal phase values preceding and following said selected past nominal phase value; and
      iii) multiplication logic adapted to combine the unscaled secondary signal estimate and the scaling factor to produce a current secondary signal estimate;
   wherein said apparatus is operative to remove secondary path signal interference from the input samples for output as compensated samples to an associated communications system based directly or indirectly upon successive current secondary signal estimates.

2. The apparatus of claim 1 wherein the scaling logic is adapted to produce a scaling factor equal to 0 when the early and later nominal phase values are at opposite constellation points, wherein the opposite constellation points are defined by a modulation scheme associated with the received multipath signal.

3. The apparatus of claim 2 wherein the scaling logic is adapted to produce a scaling factor equal to ½ when both I and Q components of the received multipath signal transition either to or from zero, wherein the transition either to or from zero occurs when the early and later nominal phase values are at neighboring constellation points and said neighboring constellation points are defined by the modulation scheme associated with the received multipath signal.

4. The apparatus of claim 3 wherein the scaling logic is adapted to produce a scaling factor equal to 1 when the early and later nominal phase values are at a same constellation point, wherein the same constellation point is defined by the modulation scheme associated with the received multipath signal.

5. The apparatus of claim 1 wherein said multiplication logic is further adapted to provide said compensation circuit with the current secondary signal estimate, wherein said compensation circuit compensates the current input sample using the current secondary signal estimate.

6. The apparatus of claim 1 further comprising at least one additional estimation circuit adapted to receive additional magnitude and phase information corresponding to additional secondary signals in the received multipath signal, wherein said buffer interface is further adapted to receive additional path delay information corresponding to the additional secondary signals, and further wherein said at least one additional estimation circuit is adapted to output additional current secondary signal estimates based on the additional magnitude and phase information and additional scaling factors in combination with additional selected past nominal phase values and additional selected early and later past nominal phase values selected by said buffer interface circuit from said buffer circuit based on the additional path delay information.

7. The apparatus of claim 6 further comprising summing logic adapted to combine the current secondary signal estimate and the additional current secondary signal estimates and provide said compensation circuit with the secondary signal estimates.

8. The apparatus of claim 1 wherein the secondary path signal is of a first type of secondary path signal having a path delay that is longer than a path delay of a main path signal within the received multipath signal.

9. The apparatus of claim 1 further comprising:
   a delay circuit adapted to receive compensated samples from said compensation circuit and to output delayed compensated samples; and
   a second compensation circuit adapted to receive delayed compensated samples and second secondary signal estimates from said estimation circuit and to output finally compensated samples based on the delayed compensated samples and the second secondary signal estimates, wherein the second secondary signal estimates correspond to one or more of a second type of secondary signals within the received multipath signal having a path delay less than the path delay of the main path signal.

10. The apparatus of claim 9 further comprising one or more second estimation circuits being adapted to receive magnitude and phase information for one or more of the second type of secondary signal and said buffer interface circuit is further adapted to receive path delay information for the one or more of the second type of secondary signal, and said one or more second estimation circuits are further adapted to output the second secondary signal estimates based on receiving additional selected past nominal phase values from said buffer circuit via said buffer interface circuit based on the path delay information for the one or more of the second type of secondary path signal and producing additional scaling factors derived from additional early and later values selected from said buffer circuit via said buffer interface circuit.

11. The apparatus of claim 10 further comprising a second summing logic adapted to combine the one or more second secondary signal estimates and provide said second compensation circuit with the second secondary signal estimates.

12. The apparatus of claim 1 wherein said buffer circuit is further adapted to receive a buffer clock signal, and is operative to maintain the running sequence of past nominal phase values based on updating the running sequence of past nominal phase values with a current nominal phase value determined for a current input sample in response to a defined transition of the buffer clock signal.

13. The apparatus of claim 12 wherein a number D of said successive buffer positions within said buffer circuit defines a maximum sample time offset between an oldest past nominal phase value in a last buffer position and a current input sample, and further wherein a buffer clock signal frequency determines a time resolution between consecutive said buffer positions and a maximum time delay between said last buffer position and the current input sample.

14. The apparatus of claim 13 wherein said apparatus is configured such that the number D of said successive buffer positions within said buffer circuit represents a time delay between said last buffer position and the current input sample that is greater than one symbol time, wherein a symbol time is defined by a modulation scheme associated with the received multipath signal.

15. The apparatus of claim 13 wherein said apparatus is configured to operate on input samples having a time resolution no greater than one chip time, wherein a chip time is defined by a spread spectrum scheme associated with the received multipath signal.

16. The apparatus of claim 13 wherein the buffer clock signal frequency is proportional to an input sample rate associated with input samples from the received multipath signal.

17. The apparatus of claim 1 wherein said compensation circuit comprises a summing circuit adapted to receive input samples and secondary signal estimates, said summing circuit adapted to output each compensated sample as a difference between a given input sample and a corresponding secondary signal estimate.

18. The apparatus of claim 17 further comprising a decimation circuit positioned in advance of said summing circuit in an input sample signal path within said compensation circuit, wherein said decimation circuit is adapted to decimate the input samples to reduce an input sample rate associated with the input samples to a decimated sample rate, and further wherein said summing circuit receives decimated input samples from said decimation circuit instead of input samples directly from the received multipath signal.

19. The apparatus of claim 18 wherein said decimation circuit is further adapted to receive configuration information from the associated communications system, and wherein said configuration information determines the decimated sample rate.

20. The apparatus of claim 18 wherein said compensation circuit is further adapted to modify a buffer clock signal provided to said buffer circuit based on the decimated sample rate, and wherein said buffer circuit is further adapted to update the running sequence of past nominal phase values with a current nominal phase value determined for a current decimated input sample in response to a defined transition of the buffer clock signal.

21. The apparatus of claim 1 wherein said memory and calculation logic is further adapted to receive and store a complex coefficient representing a magnitude and phase of the secondary path signal relative to a main path signal within the received multipath signal as part of the received magnitude and phase information, and wherein the unscaled secondary signal estimate is produced by rotating the phase of the complex coefficient using the selected one of the past nominal phase values retrieved from said buffer circuit via said buffer interface circuit.

22. The apparatus of claim 21 wherein said estimation circuit outputs successive secondary signal estimates corresponding to successive input samples based on producing successive unscaled secondary signal estimates by rotating the phase of the complex coefficient with successive past nominal phase values retrieved from the selected one of said buffer positions corresponding to the sample time offset and multiplying the successive unscaled secondary signal estimates by successive scaling factors produced by said scaling logic.

23. An apparatus comprising:
 a) a first compensation circuit adapted to receive input samples from a received multipath signal and compensate input samples using first secondary signal estimates to form first compensated samples;
 b) a delay circuit adapted to receive the first compensated samples and output delayed first compensated samples;
 c) a second compensation circuit adapted to receive the delayed first compensated samples and compensate the delayed first compensated samples using second secondary signal estimates to form second compensated samples;
 d) a hard-decision circuit adapted to receive the compensated input samples and determine a nominal phase value for each first compensated sample, wherein said hard-decision circuit outputs a selected one from a defined set of nominal phase values as the nominal phase value;
 e) a buffer circuit adapted to receive the nominal phase value from said hard-decision circuit and maintain a running sequence of past nominal phase values in successive buffer positions corresponding to successively greater sample time offsets with respect to the current input sample based on receiving the nominal phase values output from said hard-decision circuit; and
 f) a buffer interface circuit adapted to receive path delay information corresponding to one or more of first and second types of secondary path signals, and further adapted to provide selected past nominal phase values and associated early and later nominal phase values by retrieving the past nominal phase values currently held in said buffer circuit from said buffer positions corresponding to sample time offsets equal to the received path delay information and further retrieving the early nominal phase values currently held in said buffer circuit from said buffer positions which precede said buffer positions corresponding to the sample time offsets and the later nominal phase values currently held in said buffer circuit from said buffer positions which follow said buffer positions corresponding to the sample time offsets;

g) one or more first estimation circuits each adapted to provide a current first secondary signal estimate for the first type of secondary path signal, each of said first estimation circuits comprising:
  i) first memory and calculation logic adapted to receive the selected past nominal phase values, receive and store magnitude and phase information corresponding to a secondary path signal of the first type in the received multipath signal, and produce an unscaled first secondary signal estimate for an input sample based on the magnitude and phase information and a one of the selected past nominal phase values derived from prior input samples;
  ii) first scaling logic adapted to produce a scaling factor based on one or more early and later nominal phase values preceding and following the one of the selected past nominal phase values; and
  iii) first multiplication logic adapted to combine said unscaled first secondary signal estimate with said scaling factor to produce the current first secondary signal estimate; and h) one or more second estimation circuits each adapted to provide a current second secondary signal estimate for the second type of secondary path signal, each of said second estimation circuits comprising
  i) second memory and calculation logic adapted to receive the selected past nominal phase values, receive and store magnitude and phase information corresponding to a secondary path signal of the second type in the received multipath signal, and produce an unscaled second secondary signal estimate for an input sample based on the magnitude and phase information and a second one of the selected past nominal phase values derived from prior input samples;
  ii) second scaling logic adapted to produce a scaling factor based on one or more early and later nominal phase values preceding and following the second one of the selected past nominal phase values; and
  iii) second multiplication logic adapted to combine said unscaled second secondary signal estimate with said scaling factor to produce the current second secondary signal estimate;

wherein said apparatus is operative to remove secondary path signal interference for one or more of the first and second types of secondary path signals based either directly or indirectly upon one or more of the current first and current second secondary signal estimates, further wherein the first type of secondary signal has a path delay greater than a path delay of a main path signal in the received multipath signal and the second type of secondary path signal has a path delay less than the path delay of the main path signal.

24. The apparatus of claim 23 wherein the first and second scaling logics are adapted to produce a scaling factor equal to 0 when the early and later nominal phase values are at opposite constellation points, wherein the opposite constellation points are defined by a modulation scheme associated with the received multipath signal.

25. The apparatus of claim 24 wherein the first and second scaling logics are adapted to produce a scaling factor equal to ½ when both I and Q components of the received multipath signal transition either to or from zero, wherein the transition either to or from zero occurs when the early and later nominal phase values are at neighboring constellation points and said neighboring constellation points are defined by the modulation scheme associated with the received multipath signal.

26. The apparatus of claim 25 wherein the first and second scaling logics are adapted to produce a scaling factor equal to 1 when the early and later nominal phase values are at a same constellation point, wherein the same constellation point is defined by the modulation scheme associated with the received multipath signal.

27. The apparatus of claim 23 wherein said first multiplication logic in the one or more first estimation circuits is further adapted to provide said first compensation circuit with the first secondary signal estimates, wherein the first secondary signal estimates are successive current secondary signal estimates.

28. The apparatus of claim 23 wherein said second multiplication logic in the one or more second estimation circuits is further adapted to provide said second compensation circuit with the second secondary signal estimates, wherein the second secondary signal estimates are successive secondary signal estimates.

29. The apparatus of claim 23 further comprising first summing logic adapted to combine one or more current first secondary signal estimates and provide said first compensation circuit with the first secondary signal estimates.

30. The apparatus of claim 29 further comprising second summing logic adapted to combine one or more current second secondary signal estimates and provide said second compensation circuit with the second secondary signal estimates.

31. The apparatus of claim 23 wherein said second compensation circuit comprises a summing circuit adapted to receive delayed first compensated samples and second secondary signal estimates, said summing circuit adapted to output each second compensated sample as a difference between a given delayed first compensated sample and a corresponding second secondary signal estimate.

32. The apparatus of claim 23 wherein said first compensation circuit comprises a decimation circuit adapted to decimate the input samples from an input sample rate to a reduced decimated sample rate, and further comprises a summing circuit adapted to output first compensated samples as a difference between decimated input samples and first secondary signal estimates.

33. An apparatus comprising:
  a) a delay circuit adapted to receive input samples from a received multipath signal and output delayed samples;
  b) a compensation circuit adapted to receive the delayed samples and compensate the delayed samples using secondary signal estimates to form compensated samples;
  c) a hard-decision circuit adapted to receive the input samples and output a nominal phase value for each input sample;
  d) a buffer circuit adapted to receive the nominal phase value from said hard-decision circuit and maintain a running sequence of past nominal phase values in successive buffer positions corresponding to successively greater sample time offsets with respect to the current input sample based on receiving past nominal phase values output from the hard-decision circuit; and
  e) a buffer interface circuit adapted to receive path delay information corresponding to the secondary path signal and provide a selected past nominal phase value, one or more early nominal phase values, and one or more later nominal phase values by retrieving the past nominal phase value currently held in one of said buffer positions corresponding to a sample time offset equal to the received path delay information and further retrieving the one or more early nominal phase values from one or more of said buffer positions which precede said buffer position corresponding to the sample time offset and the one or more later nominal phase values from one or more of said buffer positions which follow said buffer position corresponding to the sample time offset; and g) an estimation circuit comprising
   i) memory and calculation logic adapted to receive the selected past nominal phase value selected from said buffer interface circuit, receive and store magnitude and phase information corresponding to a secondary path signal in the received multipath signal, and produce an unscaled secondary signal estimate for a current input sample based on the magnitude and phase information and the past nominal phase value derived from prior input samples;
   ii) scaling logic adapted to produce a scaling factor based on the one or more early nominal phase values and the one or more later nominal phase values preceding and following said selected past nominal phase value; and
   iii) multiplication logic adapted to combine the unscaled secondary signal estimate and the scaling factor to produce a current secondary signal estimate;

wherein said apparatus is operative to remove secondary path signal interference from the received multipath signal due to the secondary path signal based directly or indirectly upon successive current secondary signal estimates.

34. The apparatus of claim 33 wherein the scaling logic is adapted to produce a scaling factor equal to 0 when the early and later nominal phase values are at opposite constellation points, wherein the opposite constellation points are defined by a modulation scheme associated with the received multipath signal.

35. The apparatus of claim 34 wherein the scaling logic is adapted to produce a scaling factor equal to ½ when both I and Q components of the received multipath signal transition either to or from zero, wherein the transition either to or from zero occurs when the early and later nominal phase values are at neighboring constellation points and said neighboring constellation points are defined by the modulation scheme associated with the received multipath signal.

36. The apparatus of claim 35 wherein the scaling logic is adapted to produce a scaling factor equal to 1 when the early and later nominal phase values are at a same constellation point, wherein the same constellation point is defined by the modulation scheme associated with the received multipath signal.

37. The apparatus of claim 33 further comprising at least one additional estimation circuit adapted to receive additional magnitude and phase information corresponding to additional secondary signals in the received multipath signal, wherein said buffer interface is further adapted to receive additional path delay information corresponding to the additional secondary signals, and further wherein said at least one additional estimation circuit is adapted to output additional current secondary signal estimates based on the additional magnitude and phase information and additional scaling factors in combination with additional selected past nominal phase values and additional selected early and later past nominal phase values selected by said buffer interface circuit from said buffer circuit based on the additional path delay information.

38. The apparatus of claim 37 further comprising summing logic adapted to combine the current secondary signal estimate and the additional current secondary signal estimates and provide said compensation circuit with the secondary signal estimates.

39. The apparatus of claim 33 wherein the secondary path signal is of a second type of secondary path signal having a path delay that is less than a path delay of a main path signal within the received multipath signal.

* * * * *